United States Patent
Suzuki et al.

(10) Patent No.: US 7,639,765 B2
(45) Date of Patent: Dec. 29, 2009

(54) SINGLE-LINE BIDIRECTIONAL COMMUNICATION APPARATUS AND SYSTEM

(75) Inventors: Akihiro Suzuki, Osaka (JP); Makoto Hirano, Osaka (JP)

(73) Assignee: Panasonic Corporation, Osaka (JP)

( * ) Notice: Subject to any disclaimer, the term of this patent is extended or adjusted under 35 U.S.C. 154(b) by 523 days.

(21) Appl. No.: 11/661,275

(22) PCT Filed: Jul. 14, 2006

(86) PCT No.: PCT/JP2006/314049

§ 371 (c)(1),
(2), (4) Date: Feb. 27, 2007

(87) PCT Pub. No.: WO2007/034613

PCT Pub. Date: Mar. 29, 2007

(65) Prior Publication Data

US 2008/0317181 A1    Dec. 25, 2008

(30) Foreign Application Priority Data

Sep. 26, 2005    (JP) .............................. 2005-277783

(51) Int. Cl.
*H04L 7/00* (2006.01)
(52) U.S. Cl. ................... 375/354; 375/355; 375/356; 375/360; 375/368
(58) Field of Classification Search ............... 375/355, 375/354, 356, 360, 368
See application file for complete search history.

(56) References Cited

U.S. PATENT DOCUMENTS

| 5,384,769 A | 1/1995 | Oprescu et al. |
| 5,801,549 A * | 9/1998 | Cao et al. .................... 326/83 |
| 6,151,334 A | 11/2000 | Kim et al. |
| 6,198,783 B1 * | 3/2001 | Campana, Jr. ............... 375/346 |
| 6,633,588 B1 * | 10/2003 | Yoshida et al. ............... 370/489 |

FOREIGN PATENT DOCUMENTS

| EP | 1 703 761 A1 | 9/2006 |
| WO | WO 2005/064982 A1 | 7/2005 |

OTHER PUBLICATIONS

Matsushita Electric Industrial Co., Ltd., et al., "High-Definition Multimedia Interface Specification Version 1.3", Jun. 22, 2006, Supplement 1.
Matsushita Electric Industrial Co., Ltd., et al., "High-Definition Multimedia Interface Specification Version 1.2", Aug. 22, 2005, Supplement 1.

* cited by examiner

*Primary Examiner*—Shuwang Liu
*Assistant Examiner*—Kabir A Timory
(74) *Attorney, Agent, or Firm*—McDermott Will & Emery LLP

(57) ABSTRACT

A communication apparatus (400) capable of supporting two bidirectional communication protocols is connected to a single bidirectional signal line and a controller (414). Software processes of the controller (414) include only processes of requesting transmission, setting transmission data, and decoding reception data. All communication processes, such as generation of a waveform during transmission, sampling of data during reception, decoding of a reception address, and the like, are hardware processes of the communication apparatus (400). In accordance with a control of a state determining circuit (405), the generation of a waveform during transmission is controlled by a transmission control circuit (409) and a data output circuit (111), while the sampling of data during reception and the decoding of a reception address are controlled by a waveform timing check circuit (407) and a reception control circuit (410). A transmission waveform can be arbitrarily set from the controller (414), and transmission/reception timing and an operation of a forced LOW transmission control circuit (208) can be selectively performed by a hardware process or a software process.

9 Claims, 24 Drawing Sheets

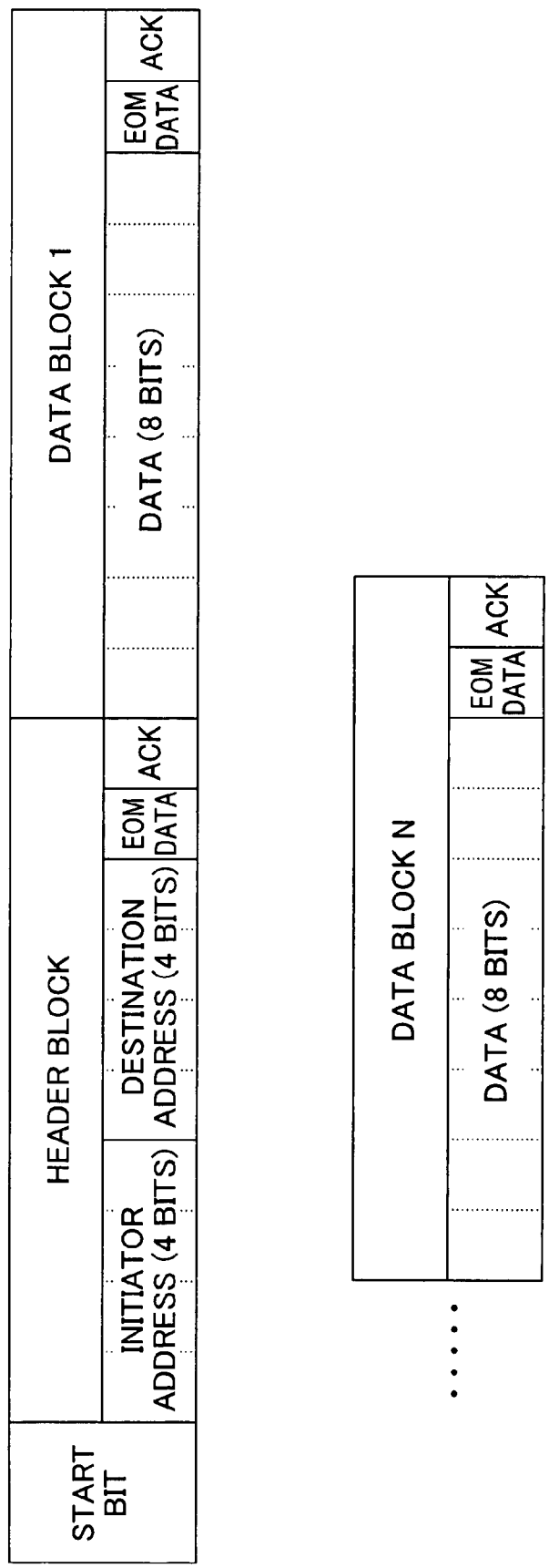

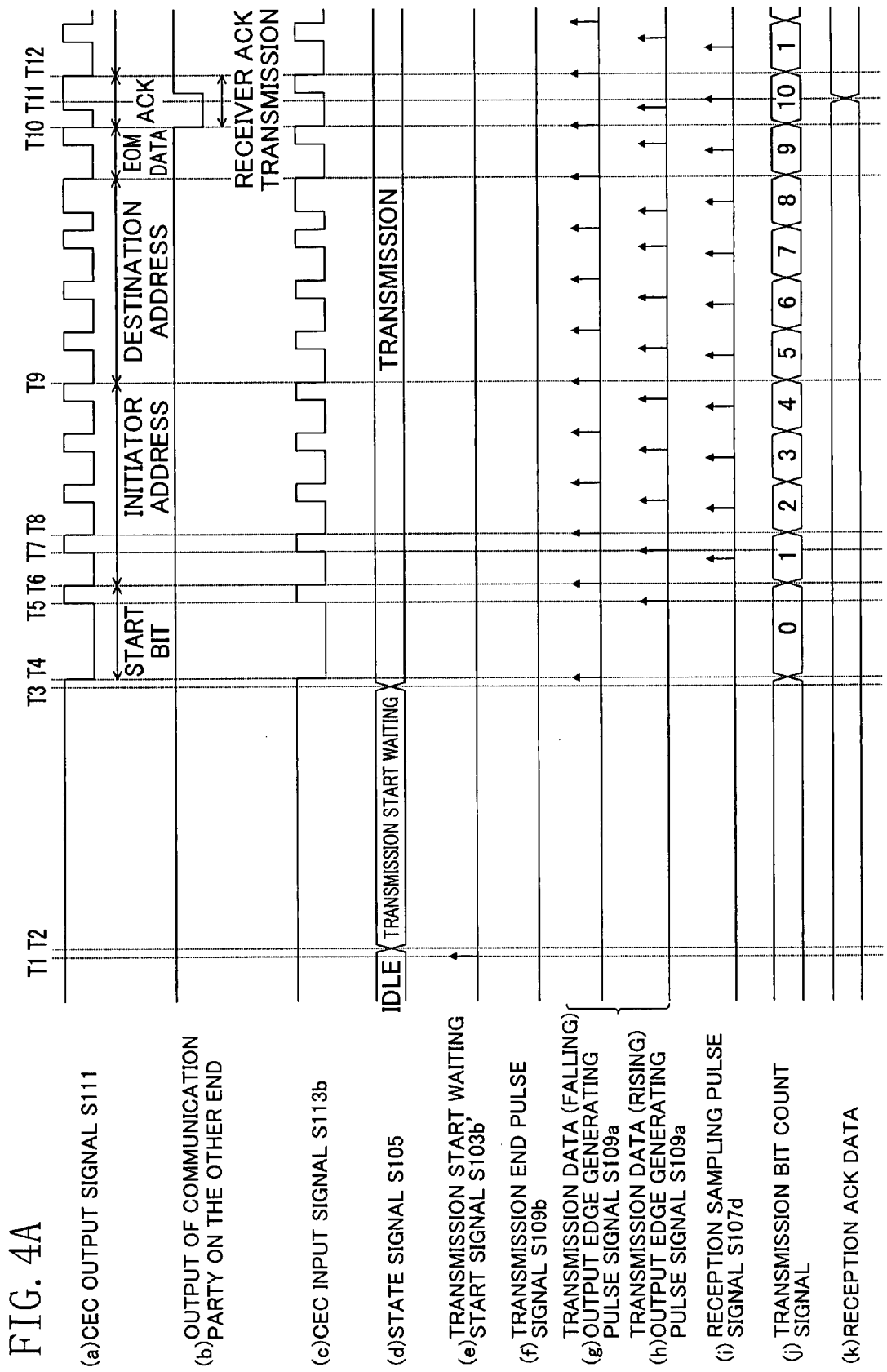

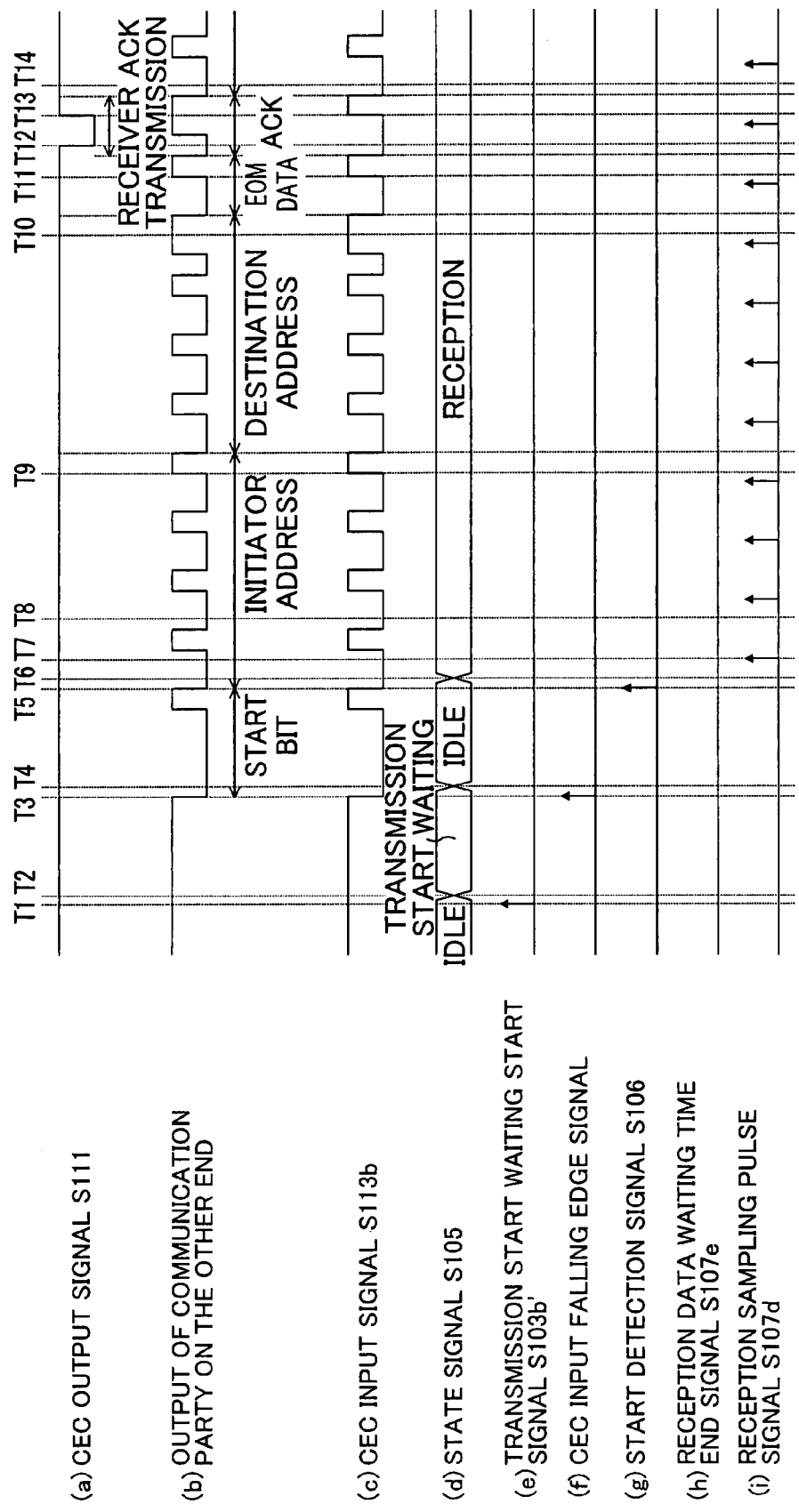

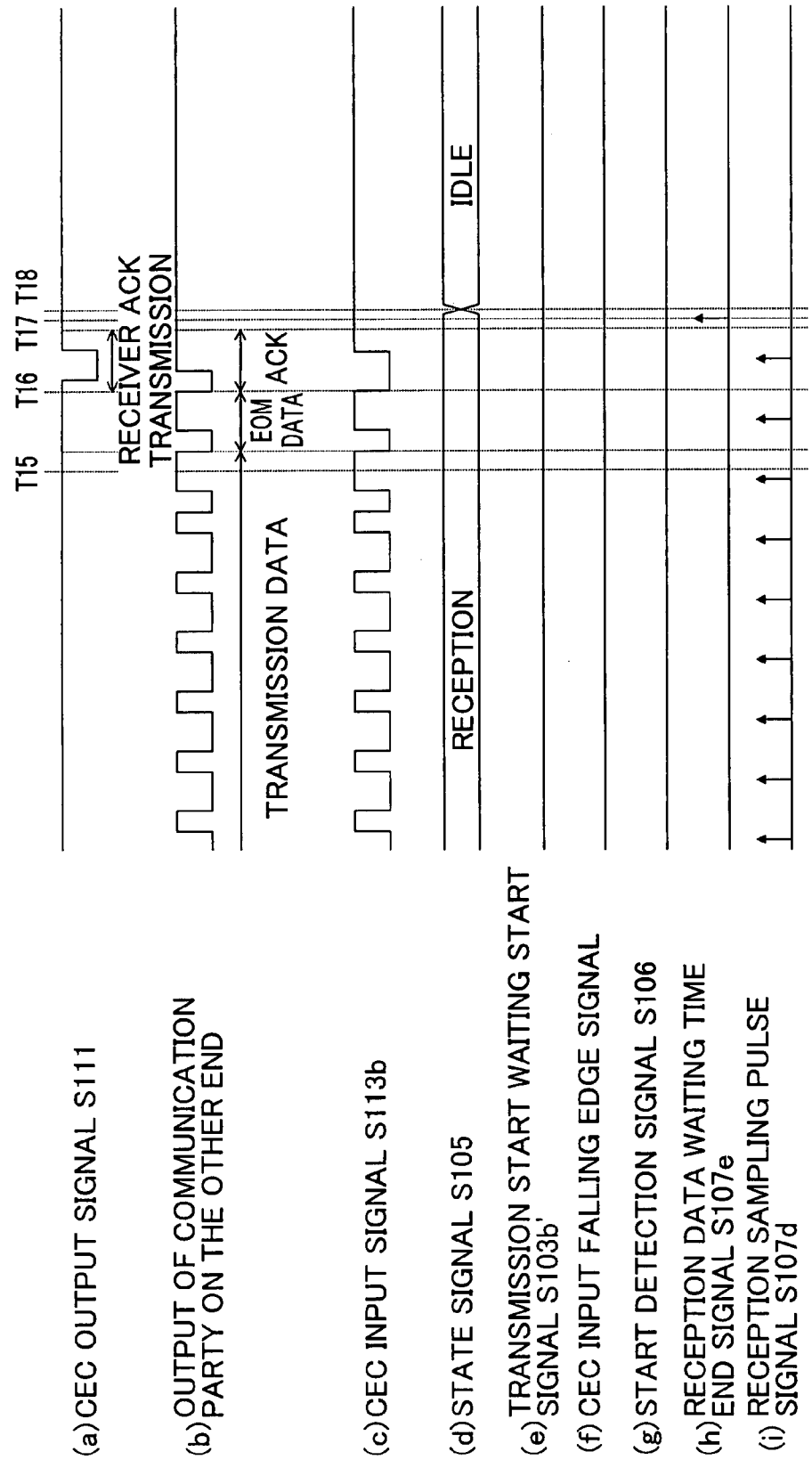

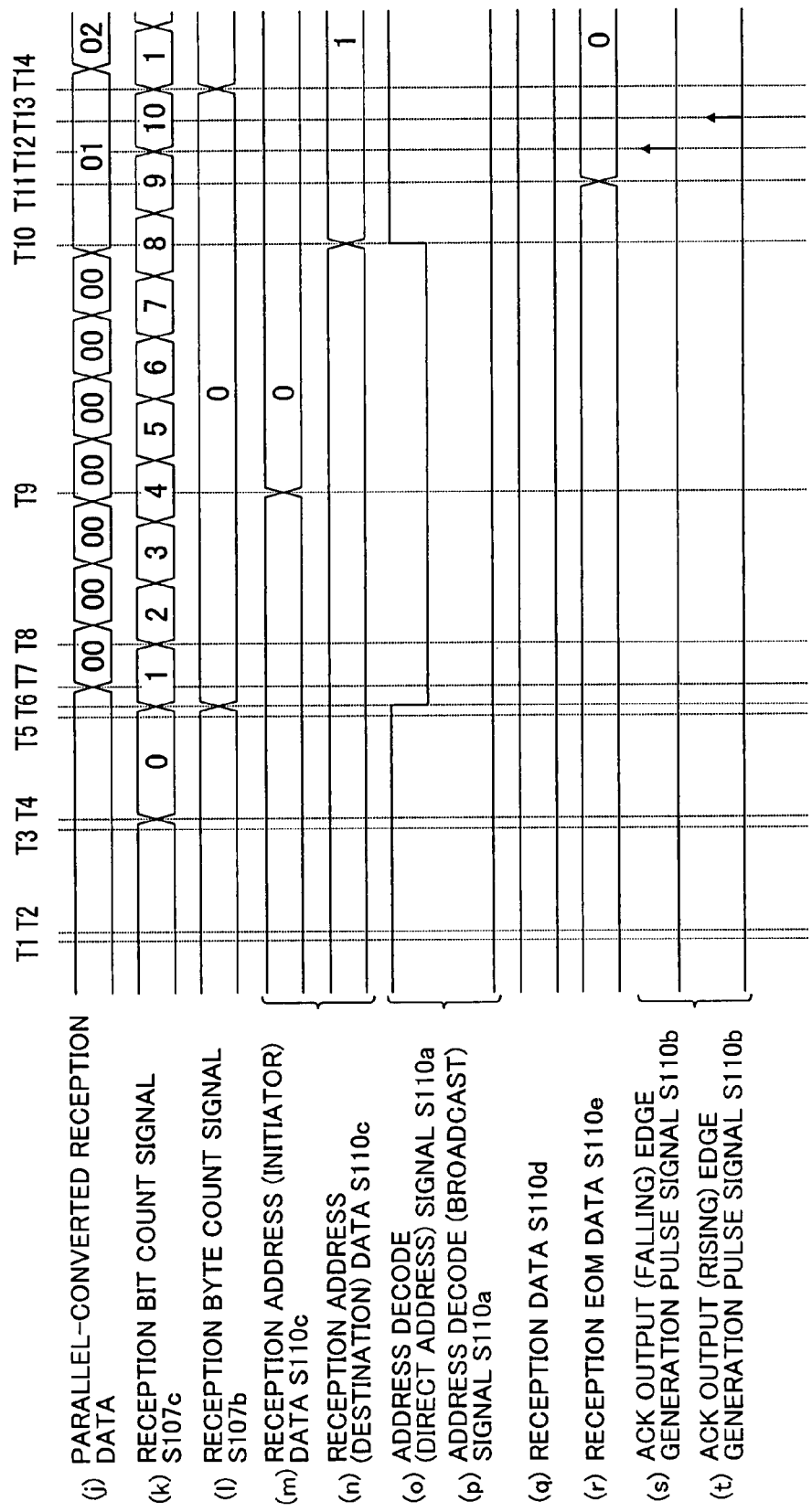

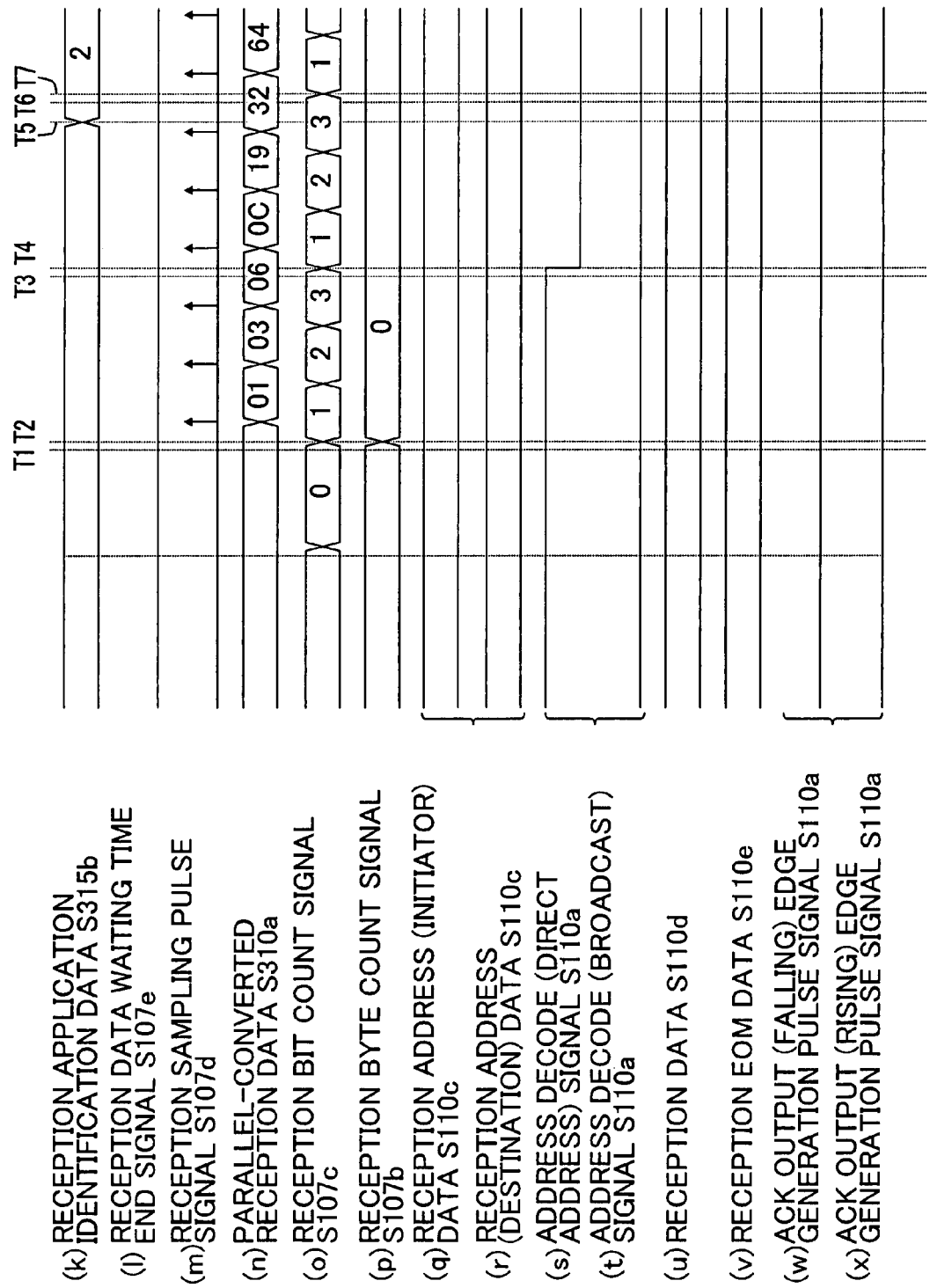

SINGLE-LINE BIDIRECTIONAL COMMUNICATION APPARATUS AND SYSTEM

RELATED APPLICATIONS

This application is the U.S. National Phase under 35 U.S.C. § 371 of International Application No. PCT/JP2006/314049, filed on Jul. 14, 2006, which in turn claims the benefit of Japanese Application No. 2005-277783, filed on Sep. 6, 2005, the disclosures of which Applications are incorporated by reference herein.

TECHNICAL FIELD

The present invention relates to an apparatus and a system which achieve bidirectional communication over a single line.

BACKGROUND ART

According to a certain digital communication technique, a video data signal can be transmitted along with a control signal over a single serial signal line in a computer system (see Patent Document 1).

At present, there are known protocols which achieve bidirectional communication of multimedia data over a single line. Examples of the protocols include a communication protocol for CEC (Consumer Electronics Control) as an optional standard in the digital interface standards HDMI (High-Definition Multimedia Interface), and a communication protocol called AV.Link (or Q-Link, etc., hereinafter collectively referred to as AV.Link) for control of a VCR from a TV (connection between SCART terminals), which is used on the European market.

Conventionally, for example, in order to achieve bidirectional communication using the AV.Link communication protocol, a timer function, an external interrupt function, and a port function, which are peripheral functions generally incorporated in an LSI, are used and controlled by a software process with a CPU.

Transmission is achieved by using the timer function to count a time defined by the standard, and in accordance with the timer interrupt, using the port output function to port-output "High" and "Low". Reception is achieved by generating an external interrupt at an edge of an AV.Link signal input by the external interrupt function, and in accordance with the external interrupt, using the timer function to check whether or not the waveform is one that is defined by the standard and perform sampling of received data. Since the AV.Link communication is bidirectional communication, an additional circuit is required for performing bidirectional communication outside the LSI using two terminals of the LSI, i.e., a transmission port output terminal and a reception external interrupt input terminal. Arbitration monitoring during transmission is performed as follows. The transmission port output terminal and the reception external interrupt input terminal of the LSI are monitored in predetermined cycles using an interrupt of the timer function. When the two terminals have different states, transmission is changed to reception.

Patent Document 1: U.S. Pat. No. 6,151,334

DISCLOSURE OF THE INVENTION

Problems to be Solved by the Invention

However, in the conventional art, the timer function, the external interrupt function, and the port function, which are peripheral functions generally incorporated in an LSI, are controlled by a software process of a CPU so that bidirectional communication is achieved using the AV.Link communication protocol. Therefore, most of the processes for achieving the AV.Link communication, such as waveform generation during transmission and data sampling during reception, particularly data decoding during transmission and reception, must be achieved by software. Therefore, the process load of the CPU is large, resulting in a decrease in the performance of the CPU.

An object of the present invention is to provide a single-line bidirectional communication apparatus which is used while being connected to a controller for a software process, and a system including the single-line bidirectional communication apparatus and the controller, in which the process load of the controller is reduced.

Solution to the Problems

According to the present invention, not all are processed by software processes, but only a transmission request process, a transmission data setting process, a reception data decoding process (interpretation and execution of a command) are performed by software processes. All communication processes, such as generation of a waveform during transmission, sampling of data during reception, decoding of a reception address, and the like, are performed by hardware processes.

Specifically, a bidirectional communication apparatus of the present invention comprises an input synchronizing circuit for synchronizing an input signal from a single bidirectional signal line based on a drive clock into a synchronized input signal, a trigger pulse generating circuit for generating a transmission request trigger pulse signal based on a transmission request from a controller, a state determining circuit for determining an operating state of the bidirectional communication apparatus to supply a state signal, a transmission control circuit for supplying a transmission data output edge generating pulse signal to control generation of a transmission waveform in accordance with a transmission data setting from the controller, based on the state signal which is changed to indicate a transmission state in accordance with the transmission request trigger pulse signal, a data output circuit for generating a waveform of an output signal to the single bidirectional signal line in accordance with the transmission data output edge generating pulse signal, an arbitration monitoring circuit for performing arbitration monitoring of a signal on the single bidirectional signal line during transmission, a reception start detecting circuit for supplying a start detection signal when the start of reception is recognized based on the synchronized input signal, a waveform timing check circuit for supplying a reception sampling pulse signal, and checking timing of a reception waveform of the synchronized input signal in response to the state signal which is changed to indicate a reception state in accordance with the start detection signal, a reception control circuit for controlling data sampling of the synchronized input signal in accordance with the reception sampling pulse signal, and decoding of a reception address, a forced LOW transmission control circuit for performing a control for forcedly transmitting a LOW level to the single bidirectional signal line when timing violation occurs in the synchronized input signal during reception, and an interrupt signal generating circuit for receiving an interrupt generating edge signal from each circuit and generating an interrupt signal to the controller. The controller is configured to receive, as observation data, reception data and the result of decoding the reception address from the reception control circuit.

EFFECT OF THE INVENTION

According to the bidirectional communication apparatus of the present invention, as compared to the achievement of bidirectional communication by conventional software processes, it is possible to significantly reduce a reduction in performance of the controller (CPU).

BRIEF DESCRIPTION OF THE DRAWINGS

FIG. 1A is a diagram illustrating a CEC communication format.

FIG. 4A is a timing diagram for describing an operation of the CEC communication apparatus of Embodiment 1 of the present invention, illustrating an operation in a transmission state.

FIG. 5A is a timing diagram for describing an operation of the CEC communication apparatus of Embodiment 1 of the present invention, illustrating an operation of transition from a transmission start waiting state to a reception state.

FIG. 5B is a diagram following FIG. 5A.

FIG. 5C is a timing diagram of the same period of time as that of FIG. 5A.

FIG. 13B is a timing diagram of the same period of time as that of FIG. 13A.

Figure 1B:
FIG. 1B is a timing diagram illustrating CEC start bit waveform timing.

DESCRIPTION OF THE REFERENCE CHARACTERS 100, 200 CEC communication circuit
101, 301, 702 drive clock generating circuit (CLK)
102 input synchronizing circuit (SYNC)
103 trigger pulse generating circuit (TRIG)
104, 504 arbitration monitoring circuit (ARB)
105, 205, 405 state determining circuit (ST)
106, 306, 406 reception start detecting circuit (RSD)
107, 307, 407 waveform timing check circuit (TMG)
108, 208 forced LOW transmission control circuit (LOW)
109, 209, 309, 409 transmission control circuit (TC)
110, 210, 310, 410 reception control circuit (RC)
111 data output circuit (OUT)
112, 212 interrupt signal generating circuit (INT)
113 N-channel MOS transistor open drain terminal (TR)
114, 214, 314, 414, 514, 703 controller (CONT)
300, 400, 500, 600, 701 CEC/AV.Link communication circuit
315 additional sequence detecting circuit (SQ)
516 arbitration period adjusting circuit (PER)
617 waveform degradation detecting circuit (DEG)
618 transmission timing set value adjusting circuit (SET)
700 CEC/AV.Link communication system
704 reference clock input terminal
705 CEC/AV.Link communication input terminal
C200 IDLE state
C201 transmission start waiting state
C202 transmission state
C203 reception state
C204 forced LOW transmission state
S101a, S700a reference clock
S101b, S702 drive clock
S102 synchronized CEC input signal
S103a transmission request signal
S103b transmission request trigger pulse signal
S103b' transmission start waiting start signal
S104 bus lost detection signal
S105 state signal
S106 start detection signal
S107a waveform timing check signal
S107b reception byte count signal
S107c reception bit count signal
S107d reception sampling pulse signal
S107e reception data waiting time end signal
S107f other party forced LOW transmission condition detection signal
S107g forced LOW transmission condition detection signal
S108 forced LOW transmission start pulse signal S109*a* transmission data output edge generating pulse signal
S109*b* transmission end pulse signal
S109*c* arbitration period gate pulse signal
S109*d*, S309*d* transmission data setting signal
S110*a* address decode signal
S110*b* ACK output edge generating pulse signal
S110*c* reception address data
S110*d* reception data
S110*e* reception EOM data
S111 CEC output signal
S112*a* interrupt generating edge signal
S112*b*, S701*b* interrupt signal
S113*a* CEC signal
S113*b* CEC input signal
S114*a*, S214*a*, S314*a*, S414*a*, S514*a*, S703 control data
S114*b*, S214*b*, S314*b*, S701*a* observation data
S201 hardware/software process selection signal
S203*a* forced LOW transmission start and end request signal
S203*b* forced LOW transmission start and end request trigger pulse signal
S209*a* transmission continuation and end setting signal
S209*b* reception ACK data
S210*a* reception ACK output setting signal
S212*a* interrupt generating edge signal (when a software process is selected)
S301 CEC/AV.Link communication selection signal
S302 synchronization CEC/AV.Link input signal
S306*a* start bit detection signal
S307*a* additional sequence timing pulse signal
S310*a* parallel-converted reception data
S313*a* CEC/AV.Link signal
S313*b*, S700*b* CEC/AV.Link input signal
S311 CEC/AV.Link output signal
S315*a* additional sequence detection signal
S315*b* reception application identification data
S401 waveform timing setting signal
S501 arbitration period setting signal
S516 adjusted arbitration period gate pulse signal
S617 waveform degradation value detection signal
S618 adjusted transmission waveform timing setting signal Best Mode for Carrying out the Invention Before describing embodiments, formats and waveform timings of CEC communication and AV.Link communication will be described with reference to FIGS. 1A to 1D.

Firstly, CEC communication will be described. The CEC communication format is illustrated in FIG. 1A. Initially, a waveform called a start bit is transmitted. Next, 9-bit data called a header block is transmitted, and thereafter, data called ACK (acknowledgement) is transmitted from a receiver. Here, the format excluding the ACK of the header block is composed of an initiator address of the first 4 bits which is an address of a transmitter, a destination address of the next 4 bits which is an address of a receiver, and EOM (End Of Message) data of the final 1 bit which is information indicating whether or not transmission is to be followed by the next block. Data block(s) are transferred after transmission of the header block until EOM data indicates the end. Each data block similarly has 9-bit data, which is transmitted before data called ACK is transmitted from a transmitter. Here, the format of the data block excluding ACK is composed of 8-bit data and EOM data. In the destination address, when transmission is performed with respect to a specific communication party on the other end, an address of the reception party is transmitted (hereinafter referred to as direct address transmission), and when transmission is performed with respect to all communication parties on the other ends, a predetermined address is transmitted (hereinafter referred to as broadcast transmission). In the two transmission situations, ACK transmission by the receiver has different meanings. Firstly, in the direct address transmission, when the receiver has normally received transmission data, ACK transmits "0", and when otherwise, ACK transmits "1". Next, in the broadcast transmission, when the receiver has normally received transmission data, ACK transmits "1", and when otherwise, ACK transmits "0".

The waveform timing of the start bit is defined by the standard as illustrated in FIG. 1B. A CEC signal is initially changed from "High" to "Low" at timing T1. Next, the CEC signal is changed from "Low" to "High" at timing T3. Timing T3 indicates reference timing defined in the standard. In the standard, timing T2 indicates a MIN value of rising of the CEC signal, and timing T4 indicates a MAX value of the rising of the CEC signal, and it is defined that the rising of the CEC signal should be present within the range between T2 and T4. Further, the CEC signal is changed from "High" to "Low" at timing T6. Here, timing T6 indicates reference timing defined in the standard. In the standard, timing T5 indicates a MIN value of falling of the CEC signal, and timing T7 indicates a MAX value of the falling of the CEC signal, and it is defined that the falling of the CEC signal should be present within the range between T5 and T7.

Figure 1C:
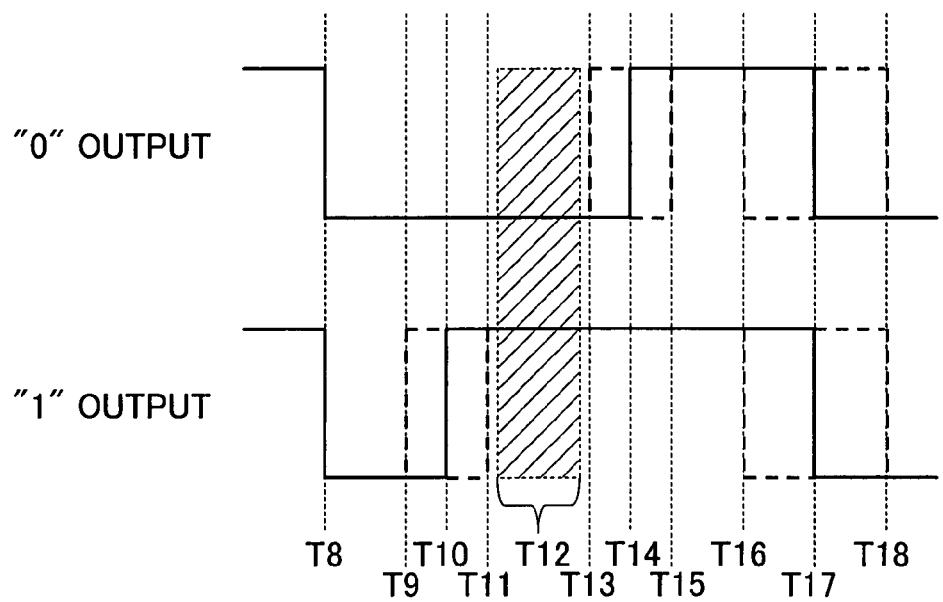
FIG. 1C is a timing diagram illustrating CEC data bit waveform timing.

Next, the waveform timing of the data bit is defined by the standard as illustrated in FIG. 1C. The waveform timing of the data bit indicates 1-bit data. Here, the upper part indicates waveform timing when "0" is output, while the lower part indicates waveform timing when "1" is output.

Firstly, the waveform timing when "0" is output will be described. Initially, the CEC signal is changed from "High" to "Low" at timing T8. Next, the CEC signal is changed from "Low" to "High" at timing T14. Here, timing T14 indicates reference timing defined by the standard. In the standard, timing T13 indicates a MIN value of rising of the CEC signal, and timing T15 indicates a MAX value of the rising of the CEC signal, and it is defined that the rising of the CEC signal should be present within the range between T13 and T15. Further, the CEC signal is changed from "High" to "Low" at timing T17. Here, timing T17 indicates reference timing defined by the standard. In the standard, timing T16 indicates a MIN value of falling of the CEC signal , and timing T18 indicates a MAX value of the falling of the CEC signal, and it is defined that the falling of the CEC signal should be present within the range between T16 and T18. In the above-described CEC waveform when "0" is output, the receiver samples data "0" at timing T12.

Next, the waveform timing when "1" is output will be described. Initially, the CEC signal is changed from "High" to "Low" at timing T8. Next, the CEC signal is changed from "Low" to "High" at timing T10. Here, timing T10 indicates reference timing defined by the standard. In the standard, timing T9 indicates a MIN value of rising of the CEC signal, and timing T11 indicates a MAX value of the rising of the CEC signal, and it is defined that the rising of the CEC signal should be present within the range between T9 and T11. Further, the CEC signal is changed from "High" to "Low" at timing T17. Here, timing T17 indicates reference timing defined by the standard. In the standard, timing T16 indicates a MIN value of falling of the CEC signal, and timing T18 indicates a MAX value of the falling of the CEC signal, and it is defined that the falling of the CEC signal should be present within the range between T16 and T18. In the above-described CEC waveform when "1" is output, the receiver samples data "1" at timing T12.

When the waveform timing of the data bit as described above is not satisfied, it is considered that data timing is violated. Further, timing violation occurs in a shorter direction than T16 indicating the falling MIN value of the CEC signal in the standard falling range between T16 and T18 of the CEC waveform, which indicates a condition under which special transmission is to be performed from the receiver to the transmitter. Here, the special transmission means that the receiver is forced to transmit "Low" for a period of time defined by the standard (hereinafter referred to as forced LOW transmission). When the forced LOW transmission is recognized by the transmitter, current transmission needs to be ended, and transmission needs to be performed again from the beginning.

Figure 1D:
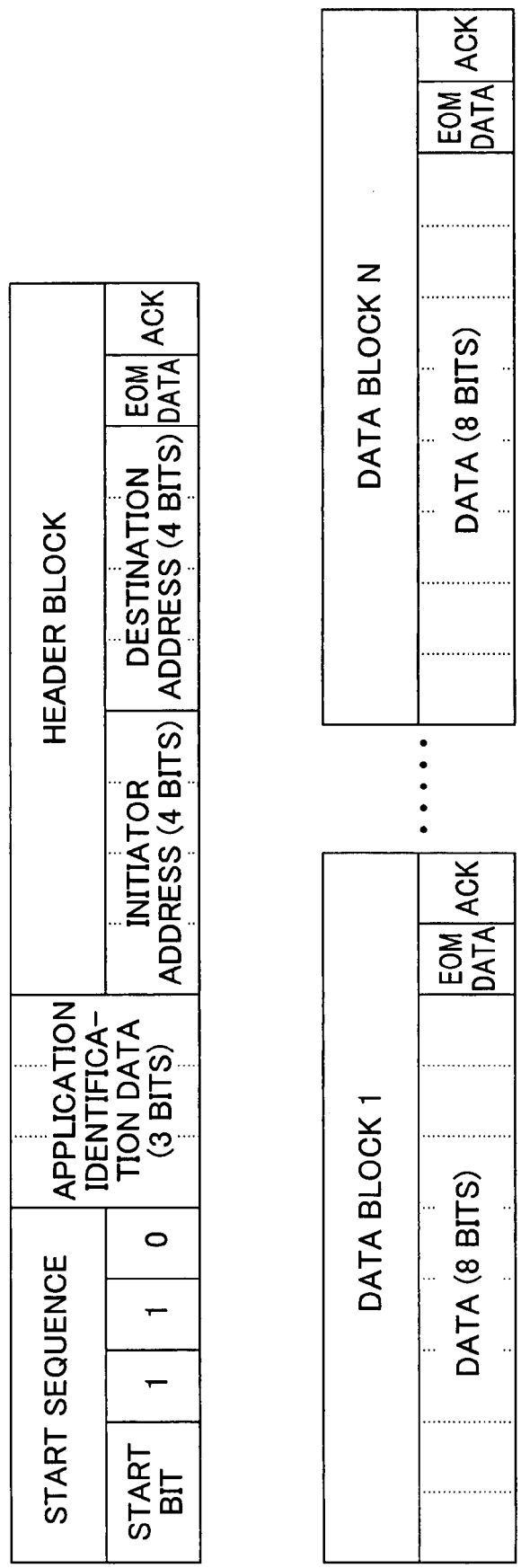
FIG. 1D is a diagram illustrating an AV.Link communication format.

Next, the AV.Link communication format will be described. In the AV.Link communication format, as illustrated in FIG. 1D, initially, a sequence called a start sequence is transmitted. In the start sequence, a start bit similar to that in the CEC communication format is initially transmitted, and next, 3-bit fixed data "110" is transmitted. Next, 3-bit data called application identification data is transmitted. Thereafter, as in the CEC communication format, a header block and a data block(s) are transmitted until EOM data of a data block indicates the end. The behaviors of ACK during direct address transmission and broadcast transmission are also similar to those in CEC communication. Note that the application identification data has any number of bits.

Next, the waveform timings of the start bit and the data bit in AV.Link communication are similar to those in CEC communication, except that each timing has a time two times longer. Note that the forced LOW transmission in CEC communication is not present in the AV.Link communication.

Embodiment 1

Figure 2:
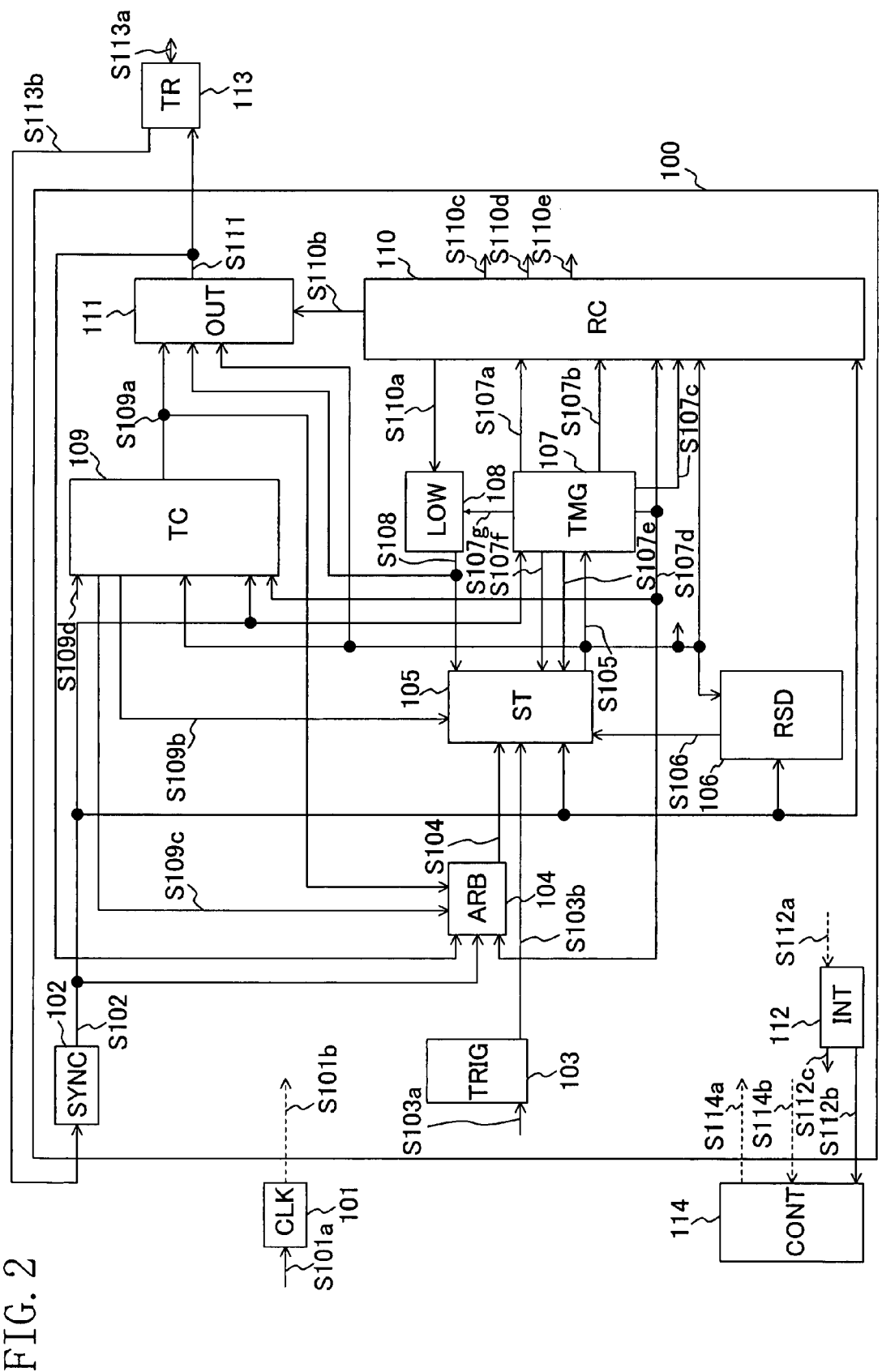
FIG. 2 is a block diagram illustrating a configuration of a CEC communication apparatus according to Embodiment 1 of the present invention.

FIG. 2 is a block diagram illustrating a configuration of a single-line bidirectional communication apparatus according to Embodiment 1 of the present invention, assuming CEC communication as specific communication.

An N-channel MOS transistor open drain terminal (TR) 113 receives and outputs the CEC signal S113a which is connected to a communication party on the other end. The CEC signal S113a is on a single signal line where a pull-up resistance is provided. Further, the N-channel MOS transistor open drain terminal 113 outputs High and Low states of the CEC signal S113a as a CEC input signal S113b, which is input to an input synchronizing circuit (SYNC) 102 described below, and also receives a CEC output signal S111 output from a data output circuit (OUT) 111 described below. Here, when the CEC output signal S111 is Low, "Low" is output from the input/output terminal to the CEC signal S113a, and when the CEC output signal S111 is High, a High Z (high impedance) is output from the input/output terminal, and the state of the CEC signal S113a is caused to be "High" by the pull-up resistance.

A drive clock generating circuit (CLK) 101 receives a reference clock S101a, and based on the reference clock S101a, generates a drive clock S101b, which is supplied to each circuit in a CEC communication circuit 100.

The input synchronizing circuit (SYNC) 102 receives the CEC input signal S113b, and performs synchronization based on the drive clock S101b, and outputs a synchronized CEC input signal S102.

A trigger pulse generating circuit (TRIG) 103 generates and outputs a transmission request trigger pulse signal S103b based on a transmission request signal S103a which is one of control data S114a from a controller (CONT) 114.

An arbitration monitoring circuit (ARB) 104 receives the CEC output signal S111 and the synchronized CEC input signal S102, and adjusts timings of the two signals into the same timing before comparing the two signals. A period of time during which the comparison is performed is determined based on an input arbitration period gate pulse signal S109c. Further, a transmission data output edge generating pulse signal S109a and a reception sampling pulse signal S107d are used as sampling points which reflect the result of the comparison. When the comparison result shows that the two signals are not the same at the sampling points, the result is recognized as a bus lost and a bus lost detection signal S104 is output.

A state determining circuit (ST) 105 is a circuit for determining an operating state of the CEC communication circuit 100, and based on an input from each circuit described above and below, determines the operating state and outputs a state signal S105. The state determining circuit 105 will be described below with reference to FIG. 3.

A reception start detecting circuit (RSD) 106 receives the synchronized CEC input signal S102 and the state signal S105, and depending on the state of the state signal S105, uses an edge of the synchronized CEC input signal S102 to reset an internal counter and load data, and determines whether or not the loaded value satisfies a timing condition for the start bit defined by the standard, and if the condition is satisfied, outputs a start detection signal S106.

A waveform timing check circuit (TMG) 107 receives the synchronized CEC input signal S102 and the state signal S105, and depending on the state of the state signal S105, uses an edge of the synchronized CEC input signal S102 to reset an internal counter and load data, and determines whether or not the loaded value is waveform data satisfying a timing condition defined by the standard, and outputs a waveform timing check signal S107a. Further, when forced LOW transmission has been recognized in the synchronized CEC input signal S102 during a transmission or reception state, an other party forced LOW transmission condition detection signal S107f is output. When abnormal waveform transmission of the transmitter has been recognized in the synchronized CEC input signal S102 during the reception state, a forced LOW transmission condition detection signal S107g is output. When the next data has not been received for a predetermined period of time during the reception state, it is considered that reception is ended no matter whether the reception is normal or abnormal, and a reception data waiting time end signal S107e is output. Based on the synchronized CEC input signal S102, the internal counter is used to output a reception byte count signal S107b, a reception bit count signal S107c, and further, the reception sampling pulse signal S107d which is generated at timing of sampling received data.

A forced LOW transmission control circuit (LOW) 108 outputs a forced LOW transmission start pulse signal S108 based on the input forced LOW transmission condition detection signal S107g and an input address decode signal S110a.

A transmission control circuit (TC) 109 controls an operation during transmission, and in accordance with the state of the input state signal S105, outputs the transmission data output edge generating pulse signal S109a so as to form a sequence and a waveform which are defined by the standard based on data set in a transmission data setting signal S109d which is one of the control data S114a from the controller 114. Further, regarding ACK from the receiver, the synchronized CEC input signal S102 and the reception sampling pulse signal S107d are used to receive ACK data, and based on transmission address data set in the transmission data setting signal S109d, it is determined whether current transmission is direct address transmission or broadcast transmission, and based on the result, determines the reception ACK data. Also, based on transmission EOM data set in the transmission data setting signal S109d, it is determined whether the transmission is continued or ended. When the transmission is ended according to the two determination results, a transmission end pulse signal S109b is output. Since CEC communication is bidirectional communication, a plurality of transmitters may perform transmission simultaneously. Therefore, during transmission, bus arbitration needs to be performed for a period of time defined by the standard, and the arbitration period gate pulse signal S109c indicating the arbitration period is output.

A reception control circuit (RC) 110 controls an operation during reception, and in accordance with the state of the input state signal S105, samples data using the synchronized CEC input signal S102, the reception byte count signal S107b, the reception bit count signal S107c, and the reception sampling pulse signal S107d, and outputs, in a sequence defined by the standard, reception address data S110c, reception data S110d, and reception EOM data S110e, which are a portion of observation data S114b input to the controller 114. The reception control circuit 110 also decodes which of its own address previously set and addresses indicating all CEC communication circuits connected to the CEC signal S113a is indicated by the reception address data S110c, and outputs the address decode signal S110a. Further, during ACK transmission, the reception control circuit 110 outputs an ACK output edge generating pulse signal S110b in accordance with the reception address data S110c and the input waveform timing check signal S107a.

In accordance with the state of the input state signal S105, the data output circuit (OUT) 111 outputs the CEC output signal S111 in accordance with edges of changes in states of the input transmission data output edge generating pulse signal S109a and the input state signal S105 during transmission of address data, data and EOM data during transmission; the CEC output signal S111 in accordance with edges of changes in states of the input ACK output edge generating pulse signal S110b and the input state signal S105 during ACK transmission during reception; and the CEC output signal S111 in accordance with edges of changes in states of the input forced LOW transmission start pulse signal S108 and the input state signal S105 during forced LOW transmission.

An interrupt signal generating circuit (INT) 112 receives, as an interrupt generating edge signal S112a, a pulse signal which is used to trigger a software process (not shown) generated by each circuit in the CEC communication circuit 100, and generates and outputs interrupt identification data S112c for identifying the interrupt generating edge signal S112a from each circuit. The interrupt identification data S112c is input as one of the observation data S114b to the controller 114. Based on the interrupt generating edge signal S112a from each circuit, the interrupt signal generating circuit 112 also generates and outputs an interrupt signal S112b which is used to trigger a software process, to the controller 114.

The controller (CONT) 114 outputs the control data S114a and receives the observation data S114b. Here, the control data S114a is data for controlling or setting a circuit in the CEC communication circuit 100 by a software process, and the observation data S114b is data for observing data generated in a circuit in the CEC communication circuit 100 by a software process.

Figure 3:
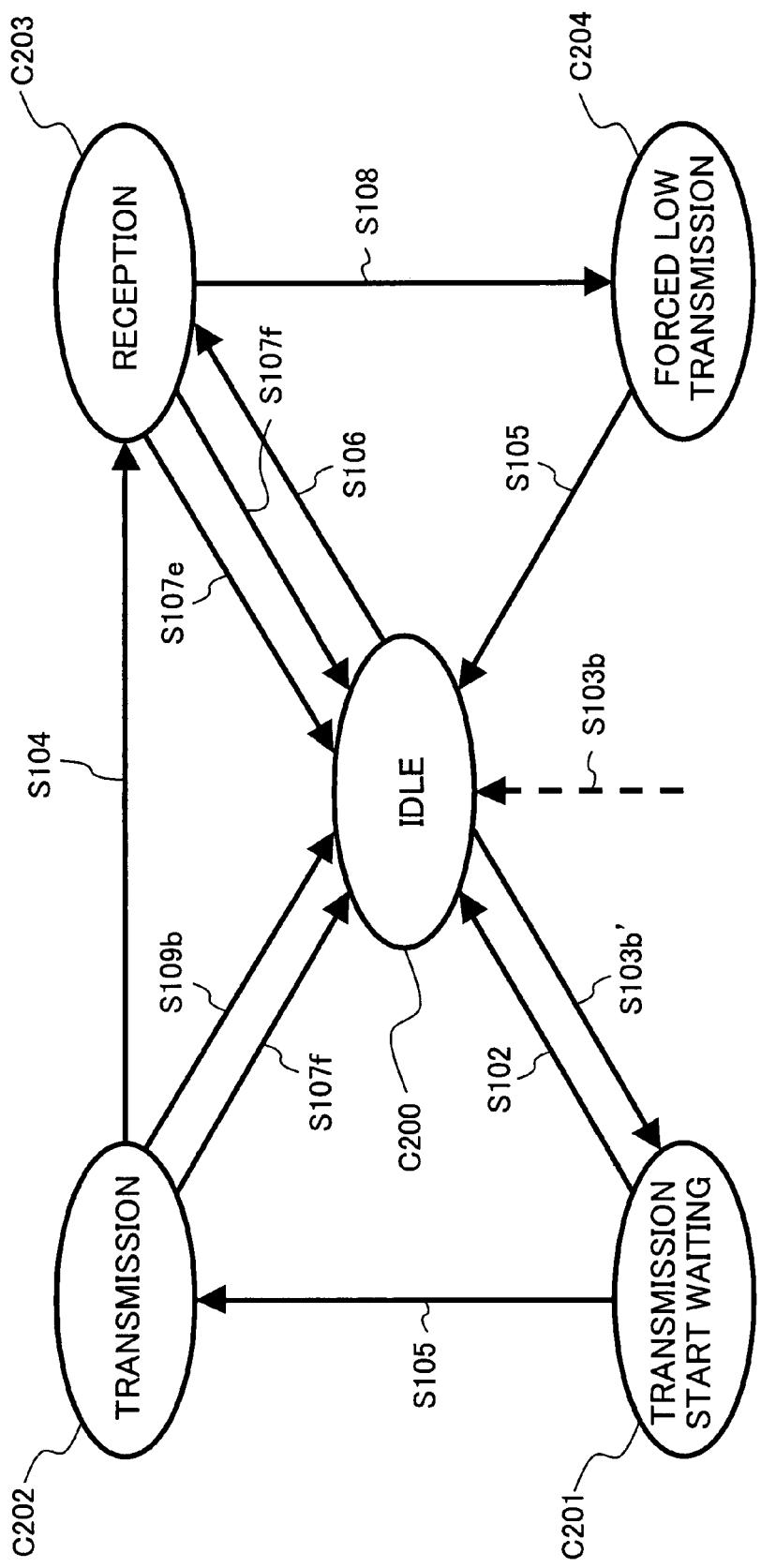
FIG. 3 is a state transition diagram illustrating state transition of the CEC communication apparatus of Embodiment 1 of the present invention.

Next, state transition of the state determining circuit 105 will be described with reference to a state transition diagram of FIG. 3.

In the CEC communication circuit 100, there are five operating states, i.e., an "IDLE" state C200, a "transmission start waiting" state C201, a "transmission" state C202, a "reception" state C203, and a "forced LOW transmission" state C204. The state signal S105 indicating the operating state is input as one of the observation data S114b to the controller 114, and can be observed by software.

The "IDLE" state C200 indicates a state in which the CEC communication circuit 100 is idle. In the "IDLE" state C200, when the transmission request trigger pulse signal S103b is generated, a transmission start waiting start signal S103b' is generated in the state determining circuit 105, and the circuit state goes to the "transmission start waiting" state C201. Here, when the transmission request trigger pulse signal S103b is generated in a state other than the "IDLE" state C200, the transmission start waiting start signal S103b' is not generated, and circuit state transition does not occur.

The "transmission start waiting" state C201 indicates that, in the CEC signal S113a, it is confirmed that no communication is performed for a predetermined period of time before transmission. In the "transmission start waiting" state C201, an incorporated counter is used to count a predetermined time, and when a change occurs in the CEC signal S113a until the predetermined time elapses, the circuit state goes to the "IDLE" state C200 in accordance with a CEC input falling edge signal which is generated in the state determining circuit 105 in accordance with the synchronized CEC input signal S102, and when a change does not occur in the CEC signal S113a, the circuit state goes to the "transmission" state in accordance with the state signal S105.

The "transmission" state C202 indicates a state in which the CEC communication circuit 100 is performing transmission. In the "transmission" state C202, bus arbitration is performed with respect to the CEC signal S113a until an initiator address in a header block is transmitted in the CEC communication format, and when the bus lost detection signal S104 is generated during this time, the circuit state goes to a "reception state" C203. Also, when the transmission end pulse signal S109b and the other party forced LOW transmission condition detection signal S107f are generated, the circuit state goes to the "IDLE" state C200.

The "reception" state C203 indicates a state in which the CEC communication circuit 100 is performing reception. In the "reception" state C203, when the forced LOW transmission start pulse signal S108 is generated, the circuit state goes to the "forced LOW transmission" state C204, and when the reception data waiting time end signal S107e or the other party forced LOW transmission condition detection signal S107f is generated, the circuit state goes to the "IDLE" state C200. In the "IDLE" state C200, when the start detection signal S106 is generated, the circuit state goes to the "reception" state C203.

The "forced LOW transmission" state C204 indicates a state in which the CEC communication circuit 100 is being forcedly transmitting LOW. This state can be reached by state transition only from the "reception" state C203. In the "forced LOW transmission" state C204, "LOW" is output to the CEC signal S113a for a time predetermined by an incorporated counter, and after the predetermined time elapses, the outputting of "LOW" to the CEC signal S113a is ended, and the internal state goes to the "IDLE" state in accordance with the state signal S105.

Figure 4B:
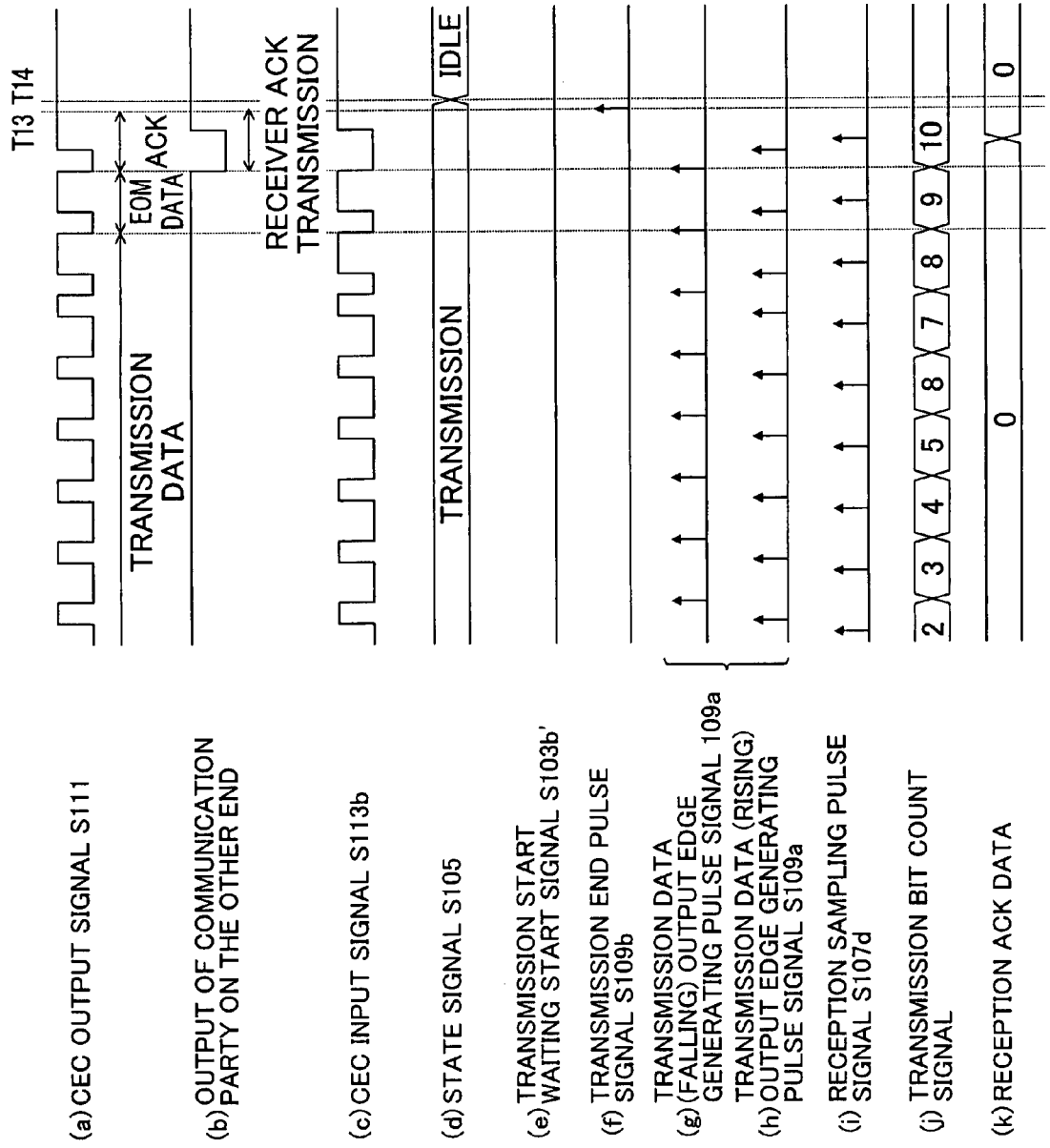
FIG. 4B is a diagram following FIG. 4A.
Figure 5D:
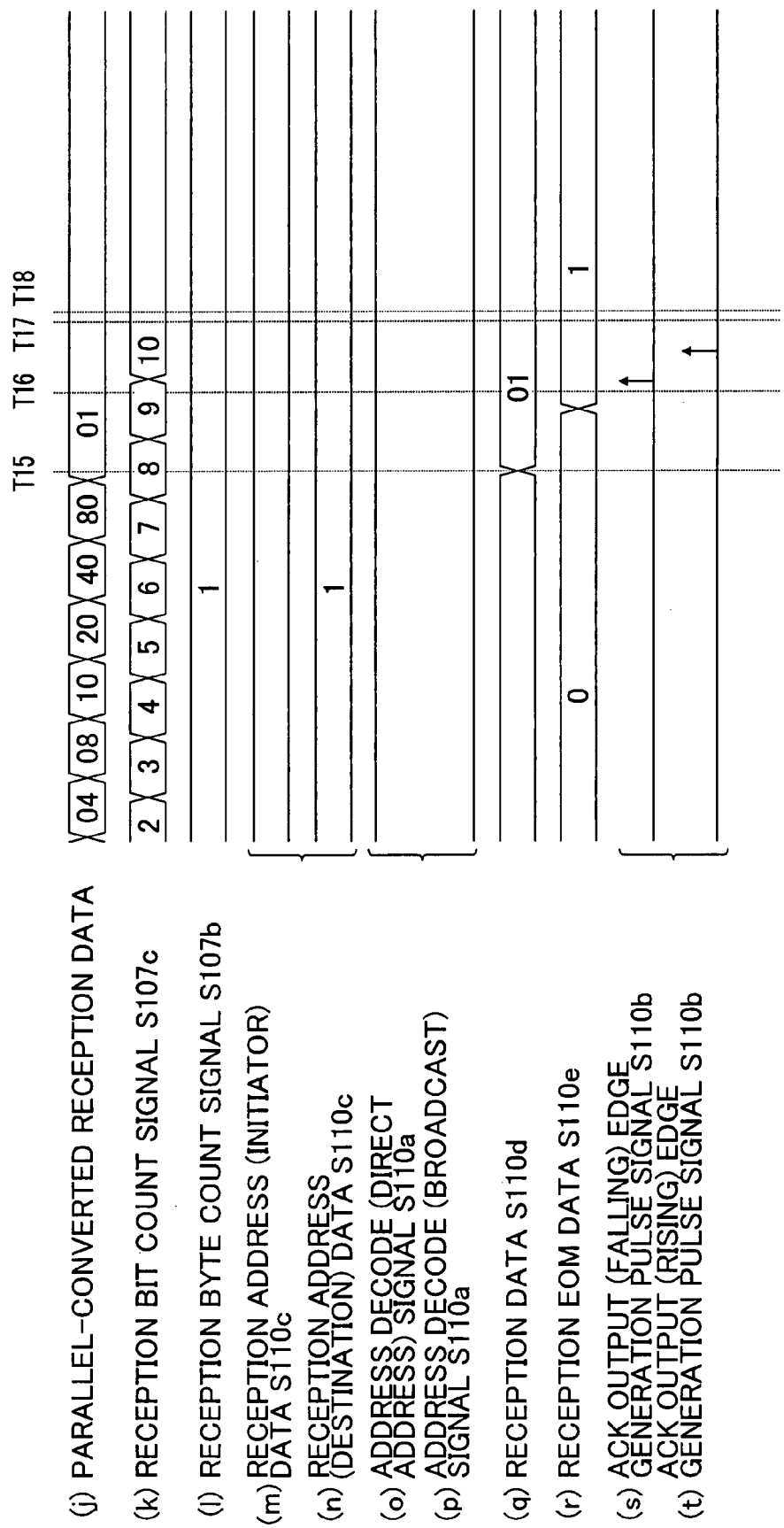
FIG. 5D is a diagram following FIG. 5C.

Next, an operation of the thus-configured CEC communication circuit 100 during "transmission" will be described with reference to timing diagrams of FIGS. 4A and 4B.

(a) indicates a waveform of the CEC output signal S111 output by the CEC communication circuit 100, (b) indicates a waveform of an output of a communication party on the other end, and (c) indicates a waveform of the CEC input signal S113b input via the N-channel MOS transistor open drain terminal 113 to the CEC communication circuit 100. Here, a wired AND of the CEC output signal S111 of (a) and the output of (b) of the communication party on the other end forms the CEC input signal S113b of (c).

Initially, at time T1, when a transmission request trigger pulse signal S103b which is to be output from the trigger pulse generating circuit 103 is generated in accordance with the transmission request signal S103a which is one of the control data S114a from the controller 114, a transmission start waiting start signal S103b' of (e) is generated in the state determining circuit 105 if the state signal S105 of (d) is "IDLE".

At time T2, the state signal S105 of (c) goes to a "transmission start waiting" state in accordance with the transmission start waiting start signal S103b' generated at time T1.

At time T3, after a predetermined time elapses from time T2 while keeping confirmed that there is not a change in the CEC input signal S113b of (c), the state signal S105 of (d) goes to a "transmission" state.

At time T4, since the state signal S105 of (d) goes to the "transmission" state at time T3, a transmission data (falling) output edge generating pulse signal S109a of (g) is generated, and "Low" forming falling indicating the start of a start bit is output from the CEC output signal S111 of (a). Also, a transmission bit count signal (an internal signal of the transmission control circuit 109) of (j) is reset to be 0.

At time T5, a transmission data (rising) output edge generating pulse signal S109a of (h) is generated, and "High" forming rising of the start bit is output from the CEC output signal S111 of (a).

At time T6, a transmission data (falling) output edge generating pulse signal S109a of (g) is generated, and "Low" forming falling indicating the end of the start bit and falling indicating the start of a data bit (first bit) of an initiator address is output from the CEC output signal S111 of (a). Also, the transmission bit count signal of (j) is counted up.

At time T7, a transmission data (rising) output edge generating pulse signal S109a of (h) is generated, and "High" generating rising of the data bit is output from the CEC output signal S111 of (a). Here, the rising timing of FIG. 4A indicates the data bit when "0" is output.

At time T8, a transmission data (falling) output edge generating pulse signal S109a of (g) is generated, and "Low" forming falling indicating the end of the data bit and falling indicating the start of the next data bit is output from the CEC output signal S111 of (a). Also, the transmission bit count signal of (j) is counted up.

At time T9, the transmission of the initiator address is ended, and next, transmission of a destination address is started. Also, during a period of time between time T4 (the start of the transmission) and time T9, bus arbitration of the CEC signal is performed, so that a transmitter is uniquely determined.

At time T10, transmission of data constituting the header block before the EOM data is ended, and next, ACK is transmitted from the receiver. Also, in the output of (b) of the communication party on the other end, "Low" forming falling indicating the start of ACK transmission is output.

At time T11, the CEC input signal S113b of (c) is sampled using a reception sampling pulse signal S107d of (i), and is stored as reception ACK data of (k).

At time T12, the transmission and reception of the header block are ended, a transmission data (falling) output edge generating pulse signal S109a of (g) is generated, and "Low" forming falling indicating the start of a data bit (first bit) of a data block to be next transmitted is output from the CEC output signal S111 of (a). Also, the transmission bit count signal of (j) is set to be 1 so as to start transmission of the next data block.

At time T13, the transmission and reception of the data block are ended, EOM data in the data block is "1", which means the end of transmission, and therefore, a transmission end pulse signal S109b of (f) is generated. At time T14, the state signal S105 of (d) goes to the "IDLE" state, and the transmission is ended.

Next, an operation of transition from the "transmission start waiting" state to the "reception" state will be described with reference to timing diagrams of FIGS. 5A to 5D.

Initially, at time T1, a transmission start waiting start signal S103b' of (e) is generated.

At time T2, a state signal S105 of (d) goes to the "transmission start waiting" state in accordance with the transmission start waiting start signal S103b' generated at time T1.

At time T3, when the state signal S105 of (d) is in the "transmission start waiting" state, a change occurs in a CEC input signal S113b of (c), and therefore, a CEC input falling edge signal of (f) is generated.

At time T4, the state signal S105 of (d) goes to the "IDLE" state in accordance with the CEC input falling edge signal generated at time T3. Also, a reception bit count signal S107c of (k) is reset to be 0.

At time T5, a start bit is transmitted from an output of (b) of a communication party on the other end, and when the start bit is recognized, a start detection signal S106 of (g) is generated.

At time T6, the state signal S105 of (d) goes to the "reception" state in accordance with the start detection signal S106 generated at time T5. Also, a reception bit count signal S107c of (k) is counted up, a reception byte count signal S107b of (l) is reset to be 0, and address decode signals S110a of (o) and (p) are also reset to be 0.

At time T7, a CEC input signal S113b of (c) is sampled using a reception sampling pulse signal S107d of (i), and is stored into parallel-converted reception data of (j) as in a shift register.

At time T8, the reception bit count signal S107c of (k) is counted up in accordance with a falling edge of the CEC input signal S113b of (c).

At time T9, the parallel-converted reception data of (j) is stored into reception address (initiator) data S110c of (m) in accordance with the reception sampling pulse signal S107d of (i), the reception bit count signal S107c of (k), and the reception byte count signal S107b of (l).

At time T10, the parallel-converted reception data of (j) is stored into reception address (destination) data S110c of (n) in accordance with the reception sampling pulse signal S107d of (i), the reception bit count signal S107c of (k), and the reception byte count signal S107b of (l). Also, it is decoded whether current transmission is direct address transmission or broadcast transmission using the stored address (destination) data S110c, to generate address decode signals S110a of (o) and (p).

At time T11, the parallel-converted reception data of (j) is stored into reception EOM data S110e of (r) in accordance with the reception sampling pulse signal S107d of (i) and the reception bit count signal S107c of (k).

At time T12, the value of ACK to be transmitted is determined based on the waveform timing check signal S107a (not shown in FIGS. 5A to 5D) and the address decode signals S110a of (o) and (p), an ACK output (falling) edge generating pulse signal S110b of (s) is generated, and "Low" forming falling of ACK is output from the CEC output signal S111 of (a). Here, FIG. 5A indicates ACK when "0" is output.

At time T13, an ACK output (rising) edge generating pulse signal S110b of (t) is generated, and "High" forming rising of ACK is output from the CEC output signal S111 of (a).

At time T14, since reception of the next data block is started in accordance with a falling edge of the CEC input signal S113b of (c), the reception bit count signal S107c of (k) is set to be 1, and the reception byte count signal S107b of (l) is counted up.

At time T15, the parallel-converted reception data of (j) is stored into reception data S110d of (q) in accordance with the reception sampling pulse signal S107d of (i), the reception bit count signal S107c of (k), and the reception byte count signal S107b of (l).

At time T17, since the next falling of the CEC input signal S113b of (c) is not recognized for a predetermined time after time T16, it is considered that transmission has been completed. Therefore, a reception data waiting time end signal S107e of (h) is generated. At time T18, the state signal S105 of (d) goes to the "IDLE" state, and reception is ended.

Figure 6:
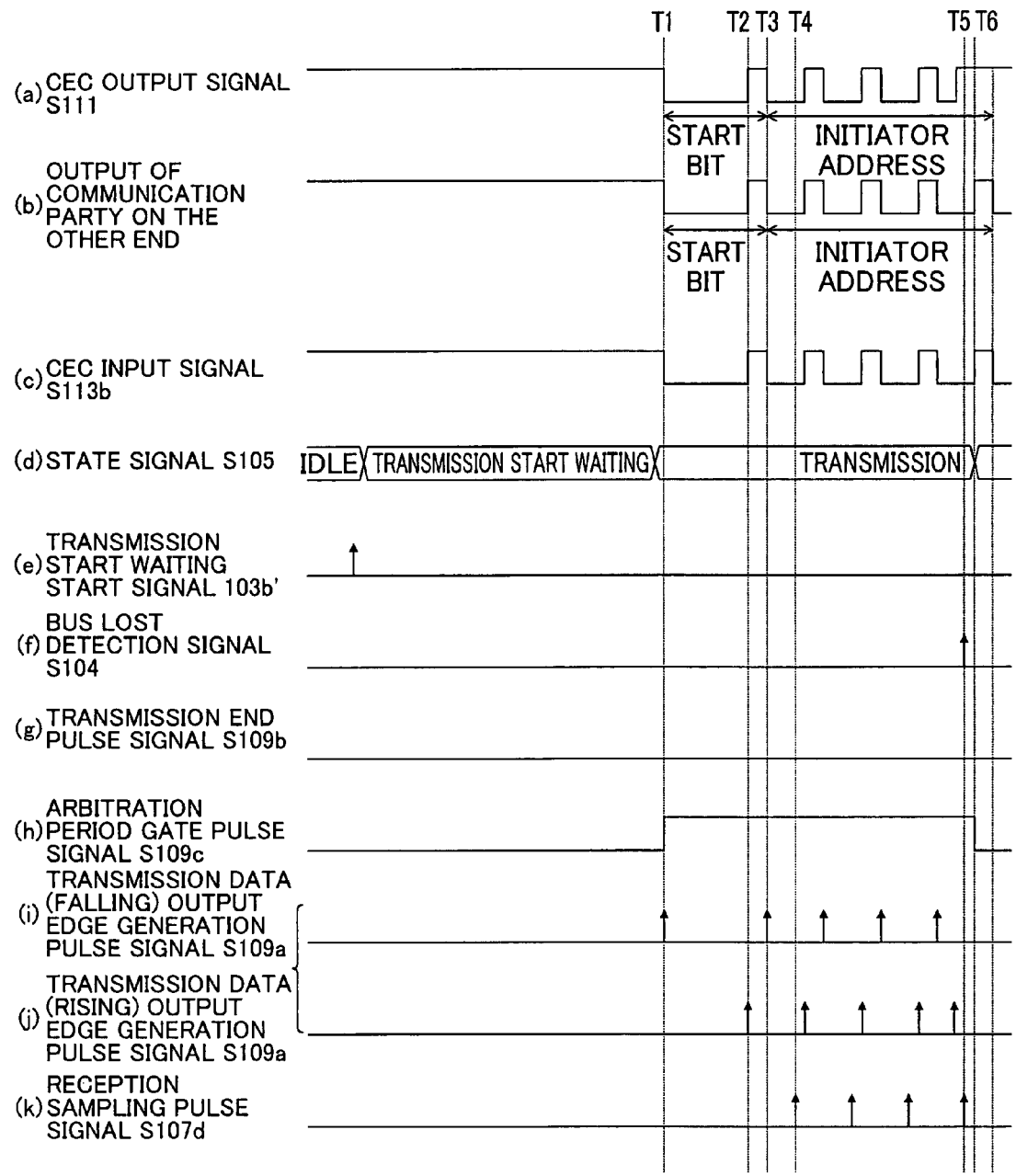
FIG. 6 is a timing diagram for describing an operation of the CEC communication apparatus of Embodiment 1 of the present invention, illustrating an operation of recognizing a bus lost from a transmission state, and going to a reception state.

Next, an operation of recognizing a bus lost and causing the "transmission" state to go to the "reception" state will be described with reference to a timing diagram of FIG. 6. Note that timings at which operations similar to those described above are performed will not be described.

At time T1, a state signal S105 of (d) is in the "transmission" state, a transmission data (falling) output edge generating pulse signal S109a of (i) is generated, and "Low" forming falling indicating the start of a start bit is output from a CEC output signal S111 of (a). Here, also in an output of (b) of a communication party on the other end, "Low" falling indicating the start of the start bit is assumed to be output at the same timing. Also, an arbitration period gate pulse signal S109c of (h) is validated, and an arbitration monitoring operation is started.

At time T2, based on a transmission data (rising) output edge generating pulse signal S109a of (j), the CEC output signal S111 of (a) goes to "High", and similarly, the output of (b) of the communication party on the other end goes to "High". Also, the transmission data (rising) output edge generating pulse signal S109a of (j) is used to determine the result of arbitration in the arbitration monitoring circuit 104. Here, both the CEC output signal of (a) and the output of (b) of the communication party on the other end go to "Low" (because values before the CEC output signal of (a) is changed are compared), and therefore, the completely similar signals are output, so that a bus lost is not recognized.

AT time T3, based on the transmission data (falling) output edge generating pulse signal S109a of (i), the CEC output signal S111 of (a) goes to "Low", and similarly, the output of (b) of the communication party on the other end also goes to "Low". Also, using the transmission data (falling) output edge generating pulse signal S109a of (i), the result of arbitration in the arbitration monitoring circuit 104 is determined. Here, both the CEC output signal of (a) and the output of (b) of the communication party on the other end go to "High" (because values before the CEC output signal of (a) is changed are compared), and therefore, the completely similar signals are output, so that a bus lost is not recognized.

At time T4, using a reception sampling pulse signal S107d of (k), the result of arbitration in the arbitration monitoring circuit 104 is determined. Here, both the CEC output signal S111 of (a) and the output of (b) of the communication party on the other end output "0", i.e., are "Low", and therefore, the completely similar signals are output, so that a bus lost is not recognized.

At time T5, using the reception sampling pulse signal S107d of (k), the result of arbitration in the arbitration monitoring circuit 104 is determined. Here, the CEC output signal S111 of (a) outputs "1" and the output of (b) of the communication party on the other end outputs "0", and therefore, the CEC input signal S113b of (c) is "0", so that the arbitration monitoring circuit 104 generates a bus lost detection signal S104 of (f).

Therefore, at time T6, the state signal S105 of (d) goes to the "reception" state, and an operation similar to that during reception is subsequently performed.

Figure 7:
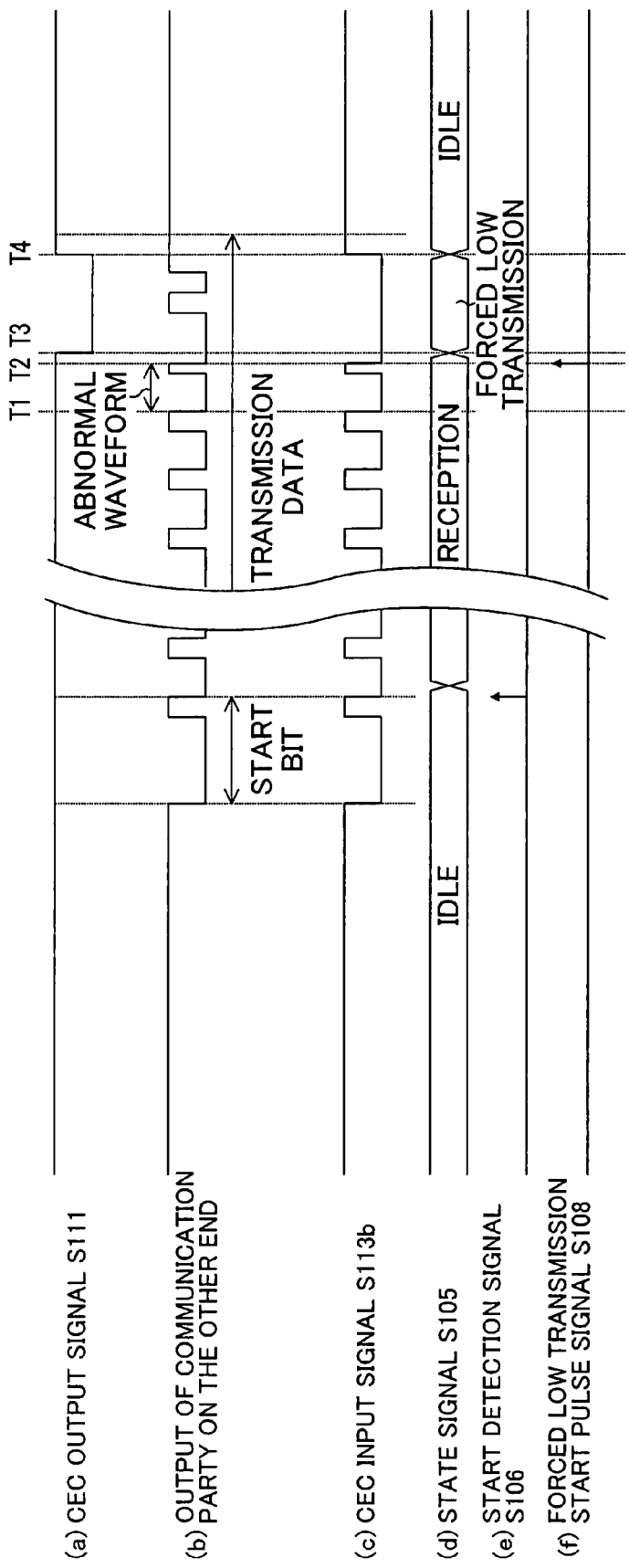
FIG. 7 is a timing diagram for describing an operation of the CEC communication apparatus of Embodiment 1 of the present invention, illustrating an operation of going from a reception state to a forced LOW transmission state.

Next, an operation of transition from the "reception" state to the "forced LOW transmission" state will be described with reference to a timing diagram of FIG. 7. Note that timings at which operations similar to those described above are performed will not be described.

At time T2, a waveform in which a cycle (a falling-to-falling time) of a data bit from time T1 does not satisfy the timing defined by the standard in a smaller direction than the MIN value, is assumed to be output from an output of (b) of the communication party on the other end. Here, a forced LOW transmission condition detection signal S107g (not shown in FIG. 7) is generated, and further, the forced LOW transmission control circuit 108 generates a forced LOW transmission start pulse signal S108 of (f).

At time T3, based on the forced LOW transmission start pulse signal S108 of (f) generated at time T2, "Low" is output from a CEC output signal S111 of (a), and at the same time, a state signal S105 of (d) goes to the "forced LOW transmission" state.

At time T4, after a predetermined time elapses from time T3, the CEC output signal S111 of (a) is caused to go to "High", and at the same time, the state signal S105 of (d) goes to the "IDLE" state, and the forced LOW transmission is ended.

Figure 8:
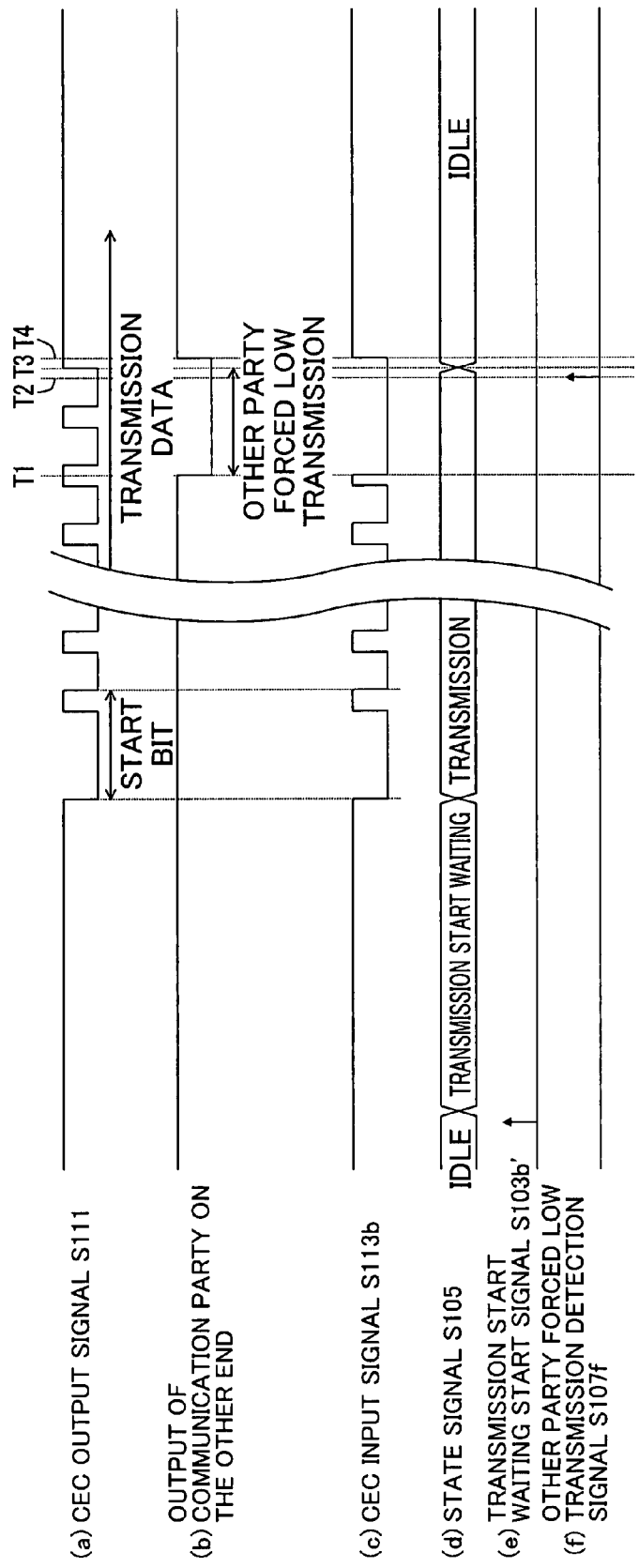
FIG. 8 is a timing diagram for describing an operation of the CEC communication apparatus of Embodiment 1 of the present invention, illustrating an operation of recognizing forced LOW transmission from a receiver from a transmission state, and going to an IDLE state.

Next, an operation of recognizing the forced LOW transmission from the receiver and causing the "transmission" state to go to the "IDLE" state will be described with reference to a timing diagram of FIG. 8. Note that timings at which operations similar to those described above are performed will not be described.

At time T1, it is assumed that a state signal S105 of (d) is in the "transmission" state, and "Low" forming falling of forced LOW transmission is output at an output of (b) of a communication party on the other end. Here, also in a CEC input signal S113b of (c), "Low" forming falling is input, the internal counter of the waveform timing check circuit 107 is reset, and counting up is started.

At time T2, when the internal counter of the waveform timing check circuit 107 reaches a predetermined time, the forced LOW transmission is recognized, and an other party forced LOW transmission condition detection signal S107f of (f) is generated. In this case, at time T3, a state signal S105 of (d) goes to the "IDLE" state, and at time T4, "High" is output from a CEC output signal S111 of (a) (Here, when "High" has already been output, a change does not occur). Also, at the output of (b) of the communication party on the other end, after "Low" is output for a predetermined time, "High" is output.

Here, after this communication process is performed, the CEC communication circuit 100 (transmitter) performs similar data retransmission.

Figure 9:
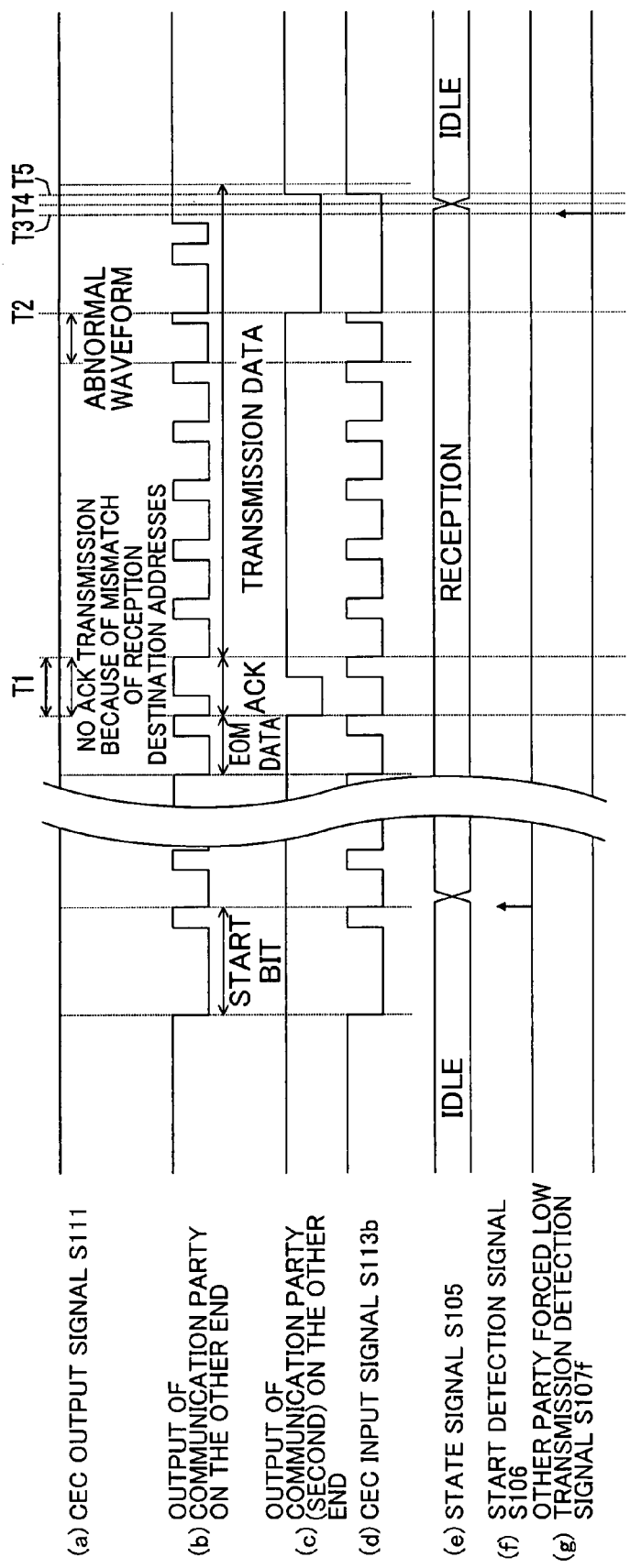
FIG. 9 is a timing diagram for describing an operation of the CEC communication apparatus of Embodiment 1 of the present invention, illustrating an operation of recognizing forced LOW transmission from another party from a reception state, and going to an IDLE state.

Next, an operation of recognizing forced LOW transmission from another party and going from the "reception" state to the "IDLE" state will be described with reference to a timing diagram of FIG. 9. Note that timings at which operations similar to those described above are performed will not be described.

Firstly, an output (c) of a communication party (second) on the other end indicates an output of the other end of CEC communication, as with the output of (b) of the communication party on the other end. A wired AND of three signals including the outputs (b) and (c) and a CEC output signal S111 of (a) is a CEC input signal S113b of (d). In an example of communication in FIG. 9, it is assumed that data is transmitted from another CEC communication circuit which generates the output of (b) of the communication party on the other end to still another CEC communication circuit which generates the output (c) of the communication party (second) on the other end, and unrelated data transmission is performed in the CEC communication circuit 100 of interest.

At time T1, ACK is transmitted from the CEC communication circuit which generates the output (c) of the communication party (second) on the other end to the CEC communication circuit which generates the output of (b) of the communication party on the other end, which is data transmission unrelated to the CEC communication circuit 100, in which ACK transmission is not performed, and no operation is performed.

At time T2, the output of (b) of the communication party on the other end transmits an abnormal waveform which satisfies the forced LOW transmission condition, and the output (c) of the communication party (second) on the other end outputs "Low" forming falling of forced LOW transmission. Here, in a CEC input signal S113b of (d), "Low" forming a falling edge is input, the internal counter of the waveform timing check circuit 107 is reset, and counting up is started.

At time T3, when the internal counter of the waveform timing check circuit 107 reaches a predetermined time, forced LOW transmission is recognized, and an other party forced LOW transmission condition detection signal S107f of (g) is generated. At time T4, a state signal S105 of (e) goes to the "IDLE" state.

At time T5, in the output (c) of the communication party (second) on the other end, after "Low" is output for a defined period of time, "High" is output. Here, after this communication process is performed, the CEC communication circuit (transmitter) which generates the output of (b) of the communication party on the other end performs similar data retransmission.

As described above, according to the CEC communication circuit 100 of Embodiment 1, software processes which trigger the interrupt signal S112b so as to achieve CEC communication are only generation of the transmission request signal S103a which triggers the start of transmission and setting of the transmission data setting signal S109d (as the control data S114a from the controller 114) and observation of the interrupt identification data S112c which is identification information of the interrupt signal S112b (as the observation data S114b) during transmission, and only observation of the reception address data S110c, the reception data S110d, the reception EOM data S110e and the interrupt identification data S112c (given as the observation data 114b to the controller 114) and decryption and execution of a command transmitted in the reception data S110d during reception. Therefore, software processes conventionally required can be significantly reduced.

In addition, CEC communication can be achieved by a small amount of software process, thereby making it possible to minimize a reduction in performance of the CPU.

Also, since a CPU resource can be effectively allocated to an application process after command interpretation of CEC communication, thereby making it possible to handle a more number of commands.

Also, the N-channel MOS transistor open drain terminal 113 is provided, and therefore, a circuit for converting into a bidirectional signal is not required outside an LSI, thereby making it possible to reduce the number of parts on a printed board.

Embodiment 2

Figure 10:
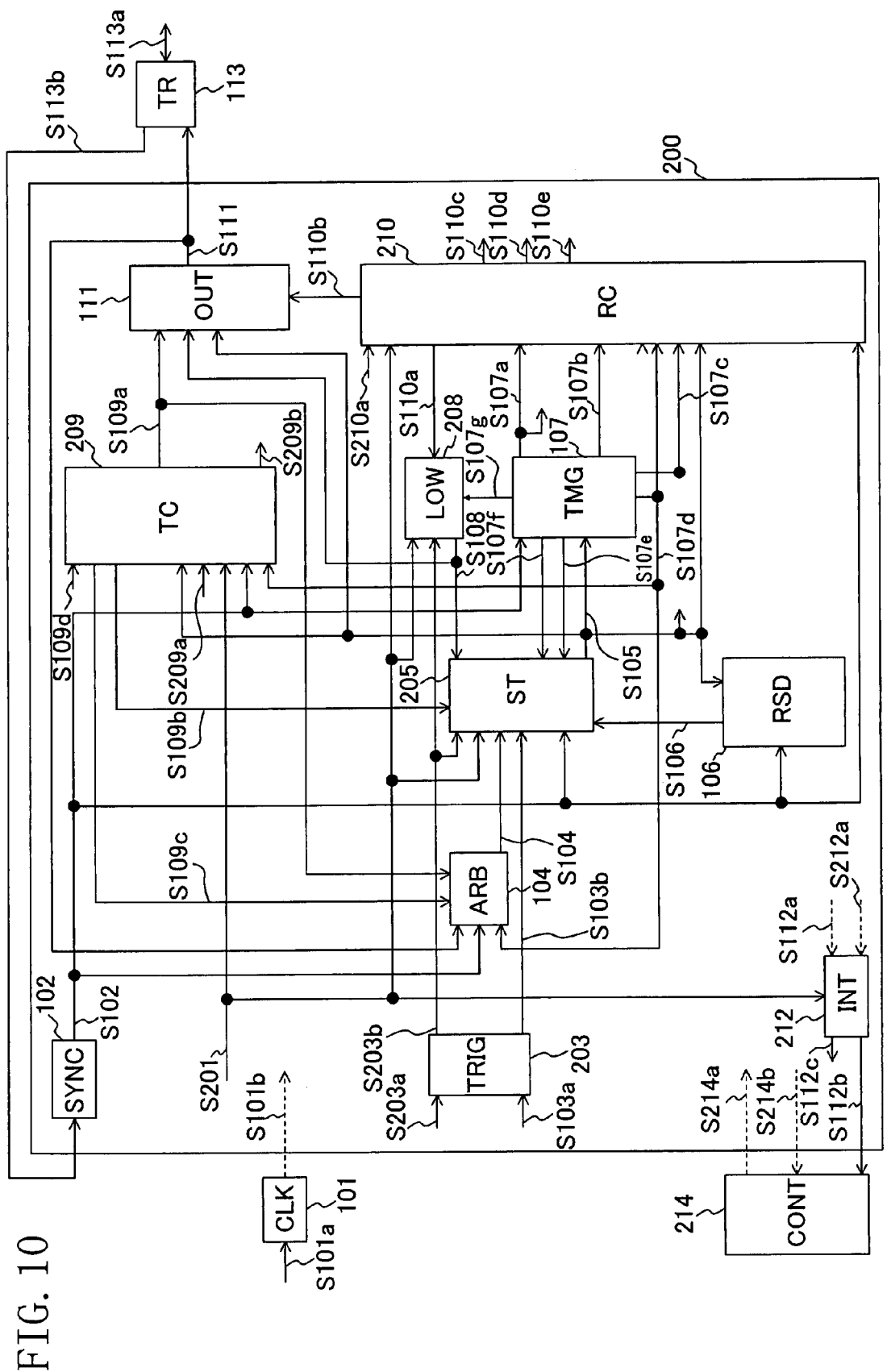
FIG. 10 is a block diagram illustrating a configuration of a CEC communication apparatus according to Embodiment 2 of the present invention.

FIG. 10 is a block diagram illustrating a configuration of a single-line bidirectional communication apparatus according to Embodiment 2 of the present invention. In FIG. 10, the same reference numerals as those in FIG. 2 indicate the same or corresponding parts. As specific communication, CEC communication is assumed.

A controller 214 outputs control data S214a for controlling a CEC communication circuit 200.

As one of the control data S214a, a hardware/software process selection signal S201 is output. The hardware/software process selection signal S201 is configured so that a portion of processes performed by hardware in Embodiment 1 can be processed by a software control in Embodiment 2, and is a signal for selecting either the hardware process or the software process. Further, in addition to the control data S214a, a forced LOW transmission start and end request signal S203a, a transmission continuation and end setting signal S209a, and a reception ACK output setting signal S210a, which are used when the software process is selected, are output.

Also, observation data S214b for observing the result of a process in the CEC communication circuit 200 is input to the controller 214. In the observation data S214b, reception ACK data S209b and the waveform timing check signal S107a are input in addition to the reception address data S110c, the reception data S110d, and the reception EOM data S110e which are used in Embodiment 1.

A trigger pulse generating circuit 203 receives the transmission request signal S103a and the forced LOW transmission start and end request signal S203a. The forced LOW transmission start and end request signal S203a is requested when transition to the "forced LOW transmission" state and transition from the "forced LOW transmission" state to the "IDLE" state are controlled by a software process, in the state signal S105 indicating an operating state of the CEC communication circuit 200. Also, a forced LOW transmission start and end request trigger pulse signal S203b is generated based on the forced LOW transmission start and end request signal S203a, a trigger pulse for requesting the start of forced LOW transmission is input to a forced LOW transmission control circuit 208 described below, and a trigger pulse for requesting the end of forced LOW transmission is input to a state determining circuit 205 described below.

The state determining circuit 205 receives the hardware/software process selection signal S201, and the trigger pulse for requesting the end of forced LOW transmission of the forced LOW transmission start and end request trigger pulse signal S203b in addition to inputs similar to those in the state determining circuit 105 of Embodiment 1. When a software process is selected in accordance with the hardware/software process selection signal S201, the state signal S105 goes from the "forced LOW transmission" state to the "IDLE" state in accordance with the input forced LOW transmission start and end request trigger pulse signal S203b.

The forced LOW transmission control circuit 208 receives the hardware/software process selection signal S201, and the trigger pulse for requesting the start of forced LOW transmission of the forced LOW transmission start and end request trigger pulse signal S203b in addition to the inputs of the forced LOW transmission condition detection signal S107g. When a software process is selected in accordance with the hardware/software process selection signal S201, the forced LOW transmission start pulse signal S108 is generated based on the input forced LOW transmission start and end request trigger pulse signal S203b and is output.

A transmission control circuit 209 receives the hardware/software process selection signal S201 and the transmission continuation and end setting signal S209a in addition to inputs similar to those in the transmission control circuit 109 of Embodiment 1. Further, the reception ACK data S209b is output, and is input as one of the observation data S214b of the controller 214. Here, when a software process is selected in accordance with the hardware/software process selection signal S201, it is determined whether the next transmission is to be continued or ended, by a software process of the controller 214, based on the transmission data setting signal S109d and the reception ACK data S209b, and the transmission continuation and end setting signal S209a which is one of the control data S214a is used to control transmission and circuit state transition, thereby controlling generation of the transmission end pulse signal S109b.

A reception control circuit 210 receives the hardware/software process selection signal S201 and the reception ACK output setting signal S210a in addition to inputs similar to those of the reception control circuit 110 of Embodiment 1, and when a software process is selected in accordance with the hardware/software process selection signal S201, sets the value of ACK to be transmitted in the reception ACK output setting signal S210a by the software process of the controller 214, based on the reception address data S110c, reception data S110d, the reception EOM data S110e, and the waveform timing check signal S107a, and controls transmission and circuit state transition, thereby controlling generation of the ACK output edge generating pulse signal S110b.

An interrupt signal generating circuit 212 receives the interrupt generating edge signal S112a generated when a hardware process is selected, and an interrupt generating edge signal (when a software process is selected) S212a when a software process is selected, and uses the two signals to generate and output the interrupt signal S112b and the interrupt identification data S112c in accordance with the hardware/software process selection signal S201. The interrupt signal S112b is input to the controller 214, and is used as a trigger for starting a software process. The interrupt identification signal S112c is input as one of the observation data S214b to the controller 214, and is used as identification data for an interrupt signal.

Here, the selection of a hardware process or a software process can be freely switched in units of a block, such as a header block or a data block in data communication or the like.

As described above, according to the CEC communication circuit 200 of Embodiment 2, two processes, i.e., a hardware process and a software process, can be selected for processes of starting or ending of forced LOW transmission, determination of ACK during transmission, and outputting of ACK during reception. Therefore, for example, when abnormal communication occurs, and therefore, either of the two processes is abnormal, the process is switched to the other process, thereby making it possible to perform communication without modifying hardware.

Also, regarding ACK determination during transmission and ACK output during reception, for example, if a new communication protocol (e.g., an additional standard for ACK determination or the like) is added to the standard in the future, since the hardware process supports the current standard, the new communication protocol is determined as abnormal communication, however, in the software process, a program which supports the new communication protocol can be produced so that ACK determination and output can be performed by software. Therefore, it is possible to support new communication without modifying hardware.

Further, regarding ACK output during reception, when it is desired that data which is a process command transmitted in a data block is interpreted by a software process, and based on the result of the interpretation, ACK transmission is determined (e.g., the interpreted command cannot be currently processed in the system), in the hardware process only extraction is performed in data, ACK output is determined based on the result of waveform timing transmitted, so that ACK is returned without considering process load in the system or the like, and communication is continued, while in the software process, ACK output can be set by the software process, command interpretation of data and process load in the system and the like can be taken into consideration and reflected on ACK output.

Embodiment 3

Figure 11:
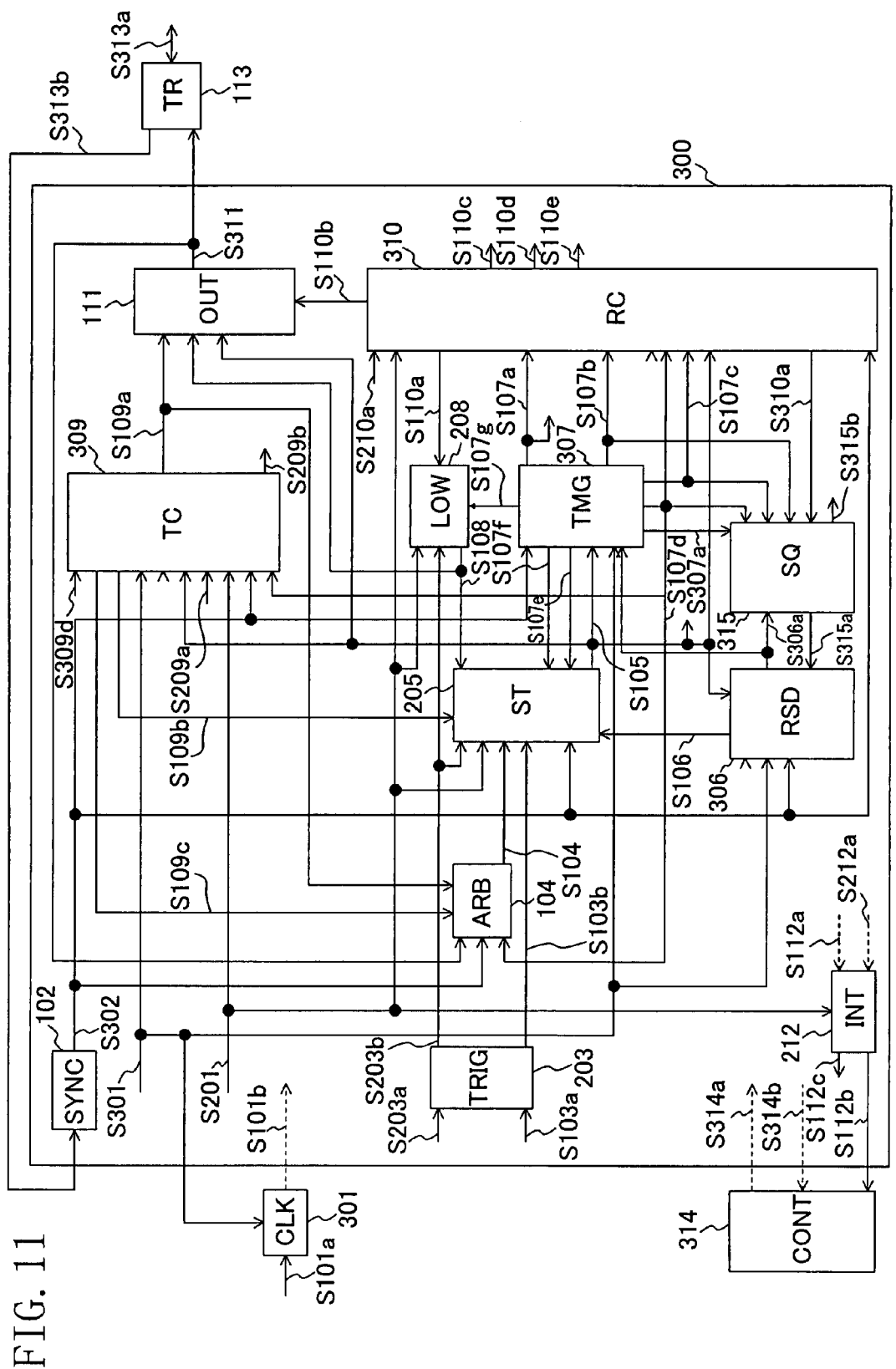
FIG. 11 is a block diagram illustrating a CEC/AV.Link communication apparatus according to Embodiment 3 of the present invention.

FIG. 11 is a block diagram illustrating a configuration of a single-line bidirectional communication apparatus according to Embodiment 3 of the present invention. In FIG. 11, the same reference numerals as those in FIGS. 2 and 10 indicate the same or corresponding parts. Also, in Embodiment 3, a single-line bidirectional communication apparatus which can support AV.Link communication in addition to the achievement of CEC communication is configured, in which the input/output signals of the N-channel MOS transistor open drain terminal 113 correspond to a CEC/AV.Link signal S313a and a CEC/AV.Link input signal S313b, and the output signal of the input synchronizing circuit 102 corresponds to a synchronization CEC/AV.Link input signal S302, the output signal of the data output circuit 111 corresponds to a CEC/AV.Link output signal S311, and these signals have altered signal names so as to support two communications, but have the same functions.

A controller 314 outputs the control data S314a for controlling a CEC/AV.Link communication circuit 300. Embodiment 3 is configured so that, as one of the control data S314a, a CEC/AV.Link communication selection signal S301 is output, and based on the CEC/AV.Link communication selection signal S301, either CEC communication or AV.Link communication can be supported. The CEC/AV.Link communication selection signal S301 is a signal for selecting one of CEC communication and AV.Link communication. As one of observation data S314b for observing the result of a process in the CEC/AV.Link communication circuit 300, a reception application identification data S315b is additionally input to the controller 314.

A drive clock generating circuit 301 receives the CEC/AV.Link communication selection signal S301, and when AV.Link communication is selected, generates a drive clock S101b which has a cycle two times longer than that of a drive clock S101b generated when CEC communication is selected. Here, all waveform timings of AV.Link communication are defined as cycles two times longer than those of waveform timings of CEC communication, and therefore, by setting the drive clock of the CEC/AV.Link communication circuit 300 to have a cycle two times longer, two communications, i.e., CEC communication and AV.Link communication, can be shared by a single circuit which performs a portion of process for forming the same communication format.

A reception start detecting circuit 306 receives the CEC/AV.Link communication selection signal S301, and when CEC communication is selected, performs a process similar to that of Embodiment 1, and when AV.Link communication is selected, generates and outputs a start bit detection signal S306a, which is input to an additional sequence detecting circuit (SQ) 315. Further, the reception start detecting circuit 306 receives an additional sequence detection signal S315a generated after 3-bit data "110" is detected in a start sequence added in the AV.Link communication format by the additional sequence detecting circuit 315, and based on the additional sequence detection signal S315a, generates and outputs the start detection signal S106.

The additional sequence detecting circuit 315 receives the start bit detection signal S306a, an additional sequence timing pulse signal S307a, the reception sampling pulse signal S107d, the reception bit count signal S107c, the reception byte count signal S107b, and a parallel-converted reception data S310a, and based on these input signals, generates and outputs the above-described additional sequence detection signal S315a, and after going to the "reception" state, receives 3-bit application identification data added in the AV.Link communication format, outputs the reception application identification data S315b, which is input as one of the observation data S314b which is an input of the controller 314.

A waveform timing check circuit 307 receives the CEC/AV.Link communication selection signal S301, and when CEC communication is performed, performs a process similar to that of Embodiment 1, and when AV.Link communication is selected, outputs 3-bit data "110" in a start sequence added in the AV.Link communication format and the additional sequence timing pulse signal S307a indicating timing of 3-bit application identification data, which are input to the additional sequence detecting circuit 315. Also, the reception byte count signal S107b and the reception bit count signal S107c are generated and output using the input start bit detection signal S306a in view of these additional sequences.

A transmission control circuit 309 receives the CEC/AV-.Link communication selection signal S301, and when CEC communication is selected, performs a process similar to that of Embodiment 2, and when AV.Link communication is selected, adds and transmits 3-bit data "110" in a 3-bit start sequence added in the AV.Link communication format, and transmits 3-bit application identification data added in the AV.Link communication format in accordance with input transmission application identification data added in a transmission data setting signal S309d. Regarding subsequent transmission, transmission is performed in order of a header block and a data block as in CEC communication illustrated in Embodiment 2.

A reception control circuit 310 performs a process of outputting the parallel-converted reception data S310a obtained by parallel-converting sampled reception data, which is input to be used for reception of application identification data in the additional sequence detecting circuit 315, in addition to the operation of Embodiment 2.

Figure 12:
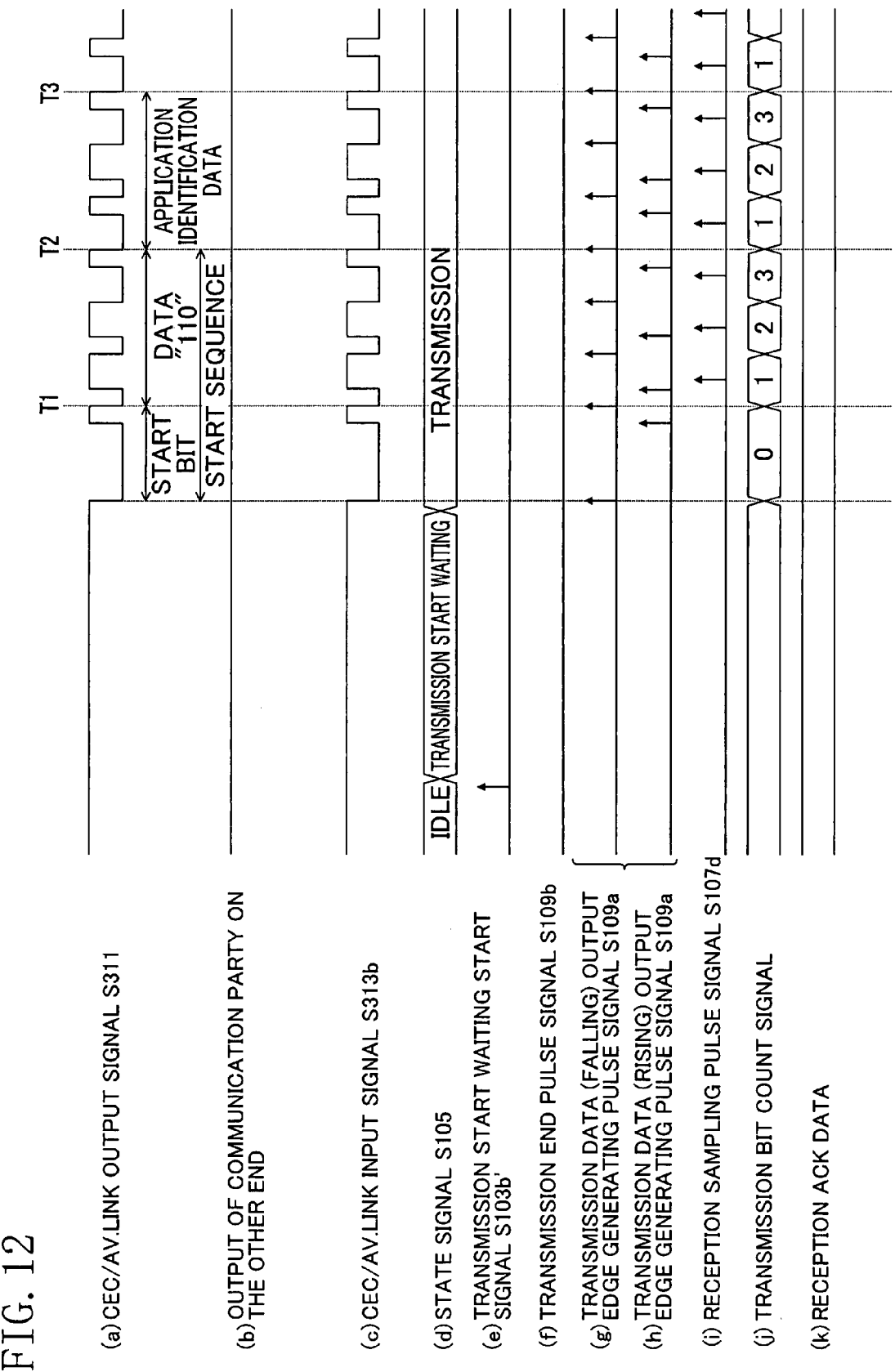
FIG. 12 is a timing diagram for describing an operation of the CEC/AV.Link communication apparatus of Embodiment 3 of the present invention, illustrating an operation in a transmission state.

Next, an operation of the thus-configured CEC/AV.Link communication circuit 300 during "transmission" when AV.Link is selected will be described with reference to a timing diagram of FIG. 12. Note that timings at which operations similar to those described in Embodiment 1 are performed will not be described.

Initially, at time T1, a transmission data (falling) output edge generating pulse signal S109a of (g) is generated, and "Low" forming falling indicating the end of a start bit and falling indicating the start of first-bit data ("1") of the 3-bit fixed data "110" in a start sequence is output from a CEC/AV.Link output signal S311 of (a). Also, a transmission bit count signal of (j) is counted up.

At time T2, the transmission of the 3-bit fixed data "110" in the start sequence is ended, and following this, transmission of the 3-bit application identification data is started.

Here, the transmission bit count signal of (j) is set to be 1 in association with the transmission of the application identification data.

At time T3, the transmission of the application identification data is ended, and transmission of an initiator address is started. Here, the transmission bit count signal of (j) is set to be 1 in association with the transmission of the initiator address. Also, the subsequent operation of the transmission process is similar to that of Embodiment 1.

Figure 13A:
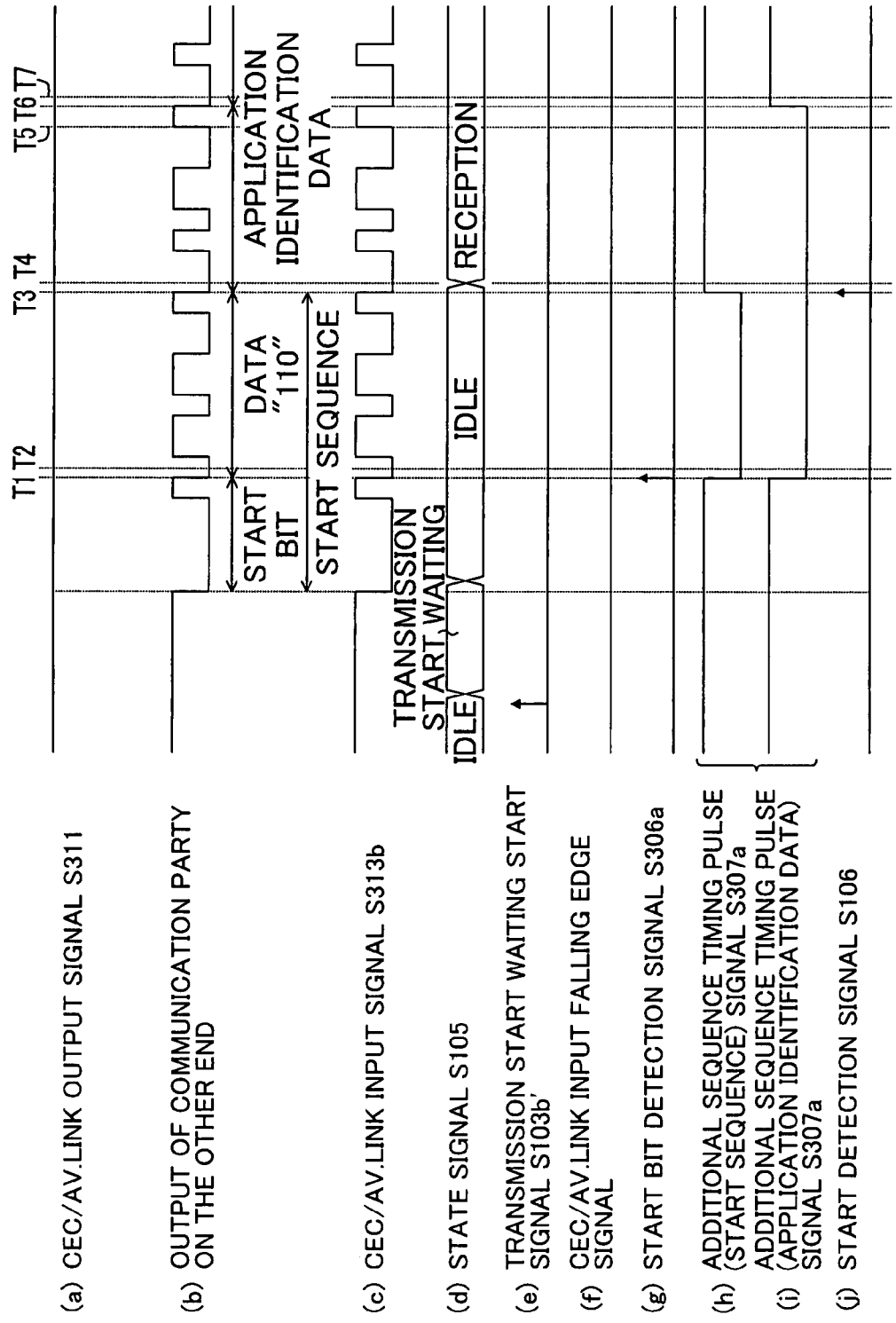
FIG. 13A is a timing diagram for describing an operation of the CEC/AV.Link communication apparatus of Embodiment 3 of the present invention, illustrating an operation of going from a transmission start waiting state to a reception state.

Next, an operation of transition from the "transmission start waiting" state to the "reception" state when AV.Link is selected will be described with reference to timing diagrams of FIGS. 13A and 13B. Note that timings at which operations similar to those described in Embodiment 1 are performed will not be described.

Initially, at time T1, the start bit in a start sequence is transmitted from a communication party on the other end of (b), and when the start bit is recognized, a start bit detection signal S306a of (g) is generated. Also, additional sequence timing pulse signals S307a of (h) and (i) are reset to be 0.

At time T2, using the start bit detection signal S306a generated at time T1, a reception byte count signal S107b of (p) is reset to be 0.

At time T3, 3-bit fixed data "110" in the start sequence is transmitted from the communication party on the other end of (b), and based on the 3-bit fixed data, a parallel-converted reception data S310a of (n) is loaded using a reception sampling pulse signal S107d of (m), a reception bit count signal S107c of (o), the reception byte count signal S107b of (p), and the additional sequence timing pulse signals S307a of (h) and (i), and when the loaded value matches the 3-bit fixed data "110", the additional sequence timing pulse (start sequence) signal S307a of (h) is set to be 1, and the start detection signal S106 of (j) is generated.

At time T4, a state signal S105 of (d) goes to the "reception" state in accordance with the start detection signal S106 generated at time T3. Also, the reception bit count signal S107c of (o) is set to be 1 so as to receive application identification data (additional sequence), and address decode signals S110a of (s) and (t) are also reset to be 0.

At time T5, in accordance with the reception sampling pulse signal S107d of (m), the reception bit count signal S107c of (o), the reception byte count signal S107b of (p), and the additional sequence timing pulse signals S307a of (h) and (i), the parallel-converted reception data S310a of (n) is stored into reception application identification data S315b of (k).

At time T6, the transmission of the application identification data from the communication party on the other end of (b) is ended, the additional sequence timing pulse (application identification data) signal S307a of (i) is set to be 1.

At time T7, the reception bit count signal S107c of (o) is set to be 1 since the initiator address has been received. The subsequent operation of the reception process is similar to that of Embodiment 1.

As described above, according to the CEC/AV.Link communication circuit 300 of Embodiment 3, in a function of measuring a time, such as the counter in the CEC/AV.Link communication circuit 300, a process of a common format portion of two communication functions can be performed by a single circuit, so that only by changing and adding a circuit corresponding to the additional sequence in the AV.Link communication to small extent, the two communication formats, i.e., CEC communication and AV.Link communication, can be supported, where the circuit scale can be significantly reduced.

Embodiment 4

Figure 14:
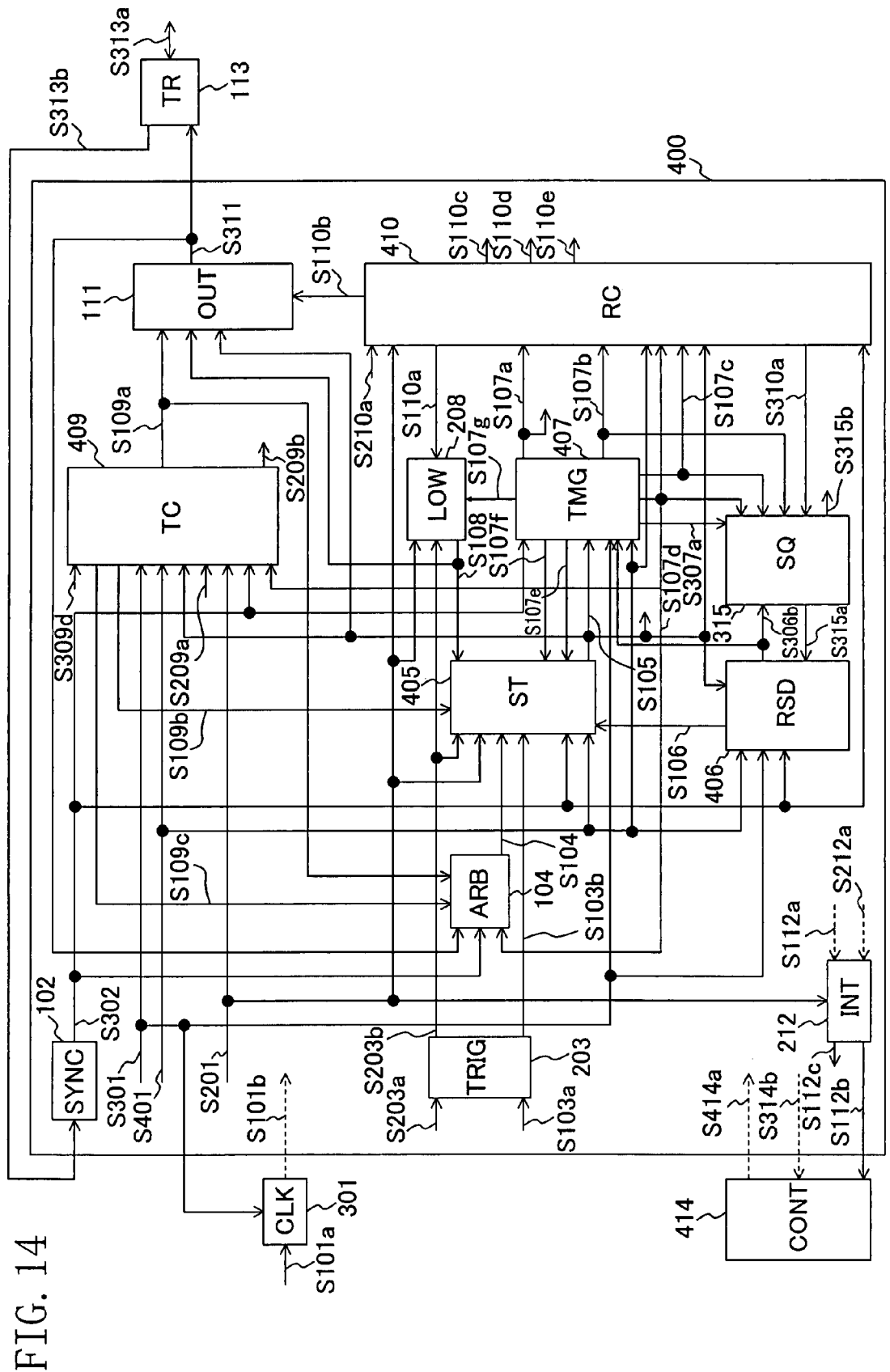
FIG. 14 is a block diagram illustrating a configuration of a CEC/AV.Link communication apparatus according to Embodiment 4 of the present invention.

FIG. 14 is a block diagram illustrating a configuration of a single-line bidirectional communication apparatus according to Embodiment 4 of the present invention. In FIG. 14, the same reference numerals as those of FIGS. 2, 10 and 11 indicate the same or corresponding parts. As specific communication, CEC communication and AV.Link communication are assumed.

A controller 414 outputs control data S414a for controlling a CEC/AV.Link communication circuit 400. As one of the control data S414a, a waveform timing setting signal S401 is output. The waveform timing setting signal S401 is a signal for separately setting rising (T3 in FIG. 1B) and falling (T6 in FIG. 1B) of start bit waveform timing during transmission; a rising MIN value (T2 in FIG. 1B), a rising MAX value (T4 in FIG. 1B), a falling MIN value (T5 in FIG. 1B), and a falling MAX value (T7 in FIG. 1B) of start bit waveform timing during reception; rising when "0" is output (T14 in FIG. 1C), rising when "1" is output (T10 in FIG. 1C), and falling when "0" and "1" are output (time T17 in FIG. 1C) of data bit waveform timing during transmission; a rising MIN value (T13 in FIG. 1C) and a rising MAX value (T15 in FIG. 1C) when "0" output is received, a rising MIN value (T9 in FIG. 1C) and a rising MAX value (T11 in FIG. 1C) when "1" output is received, a falling MIN value (T16 in FIG. 1C) and a falling MAX value (T18 in FIG. 1C) when "0" and "1" outputs are received of data bit waveform timing during reception; and timing of a reception sampling point (T12 in FIG. 1C). Further, the waveform timing setting signal S401 includes a timing setting signal for a time of forced LOW transmission, a time of recognition of forced LOW transmission, and a limit time of waiting of the next reception data.

A state determining circuit 405 receives the waveform timing setting signal S401 which is one of the control data S414a from the controller 414 in addition to the input and output signals illustrated in Embodiment 2. The waveform timing setting signal S401 input to the state determining circuit 405 is a signal for setting the time of forced LOW transmission described above, with which a time from the beginning of the "forced LOW transmission" state until the state goes to the "IDLE" state can be arbitrarily set.

A reception start detecting circuit 406 receives the waveform timing setting signal S401 which is one of the control data S414a from the controller 414 in addition to the input and output signals illustrated in Embodiment 3. The waveform timing setting signal S401 input to the reception start detecting circuit 406 includes four waveform timing setting signals for setting timings of a rising MIN value (T2 in FIG. 1B), a rising MAX value (T4 in FIG. 1B), a falling MIN value (T5 in FIG. 1B), and a falling MAX value (T7 in FIG. 1B) of the above-described start bit waveform timing during reception, with which a start bit reception recognition condition can be arbitrarily set.

A waveform timing check circuit 407 receives the waveform timing setting signal S401 which is one of the control data S414a from the controller 414 in addition to the input and output signals illustrated in Embodiment 3. The waveform timing setting signal S401 input to the waveform timing check circuit 407 includes nine waveform timing setting signals for setting timings of a rising MIN value (T13 in FIG. 1C) and a rising MAX value (T15 in FIG. 1C) when "0" output is received, a rising MIN value (T9 in FIG. 1C) and a rising MAX value (T11 in FIG. 1C) when "1" output is received, and a falling MIN value (T16 in FIG. 1C) and a falling MAX value (T18 in FIG. 1C) when "0" and "1" outputs are received of the above-described data bit waveform timing during reception; a timing of a reception sampling point (T12 in FIG. 1C); and timings of a time recognition of forced LOW transmission and a limit time of waiting of the next reception data, with which a data bit waveform timing check condition and a forced LOW transmission recognition condition can be arbitrarily set. Also, a time until the "reception" state is transitioned to the "IDLE" state, i.e., generation of the reception data waiting time end signal S107e can be arbitrarily set.

A transmission control circuit 409 receives the waveform timing setting signal S401 which is one of the control data S414a from the controller 414 in addition to the input and output signals illustrated in Embodiment 3. The waveform timing setting signal S401 input to the transmission control circuit 409 includes five waveform timing setting signals for setting timings of rising (T3 in FIG. 1B) and falling (T6 in FIG. 1B) of the above-described start bit waveform timing during transmission, and timings of rising when "0" is output (T14 in FIG. 1C), rising when "1" is output (T10 in FIG. 1C), and falling when "0" and "1" are output (T17 in FIG. 1C) of the data bit waveform timing during transmission, with which all transmission timings of a start bit and data bits during transmission can be arbitrarily set.

A reception control circuit 410 receives the waveform timing setting signal S401 which is one of the control data S414a from the controller 414 in addition to the input and output signals illustrated in Embodiment 3. The waveform timing setting signal S401 input to the reception control circuit 410 includes a signal for setting a timing of rising when "0" is output (T14 of FIG. 1C) of the above-described data bit waveform timing during ACK transmission, with which the timing of rising when "0" is output during ACK transmission can be arbitrarily set.

As described above, according to the CEC/AV.Link communication circuit 400 of Embodiment 4, even when communication needs to be performed with a party which outputs a waveform which does not satisfy the standard, a data timing check condition during reception can be arbitrarily set, and communication in which timing is adjusted by the waveform timing setting signal S401 can be performed.

Also, even when a normal signal is transmitted, abnormal communication occurs due to the occurrence of a degradation in a waveform on a cable connected to a communication party on the other end before reaching the communication party. Also, in this case, timing during transmission can be arbitrarily set, thereby making it possible to achieve communication in which the timing of a transmission edge is adjusted so as to perform normal transmission, in view of a connection environment.

Further, for example, even if a standard in which communication speed is increased while a communication protocol remains similar is developed in the future, all waveform timings during transmission and reception can be arbitrarily set. Therefore, for example, when communication is desired to be performed with double speed, all waveform timings are set to be ½, thereby making it possible to achieve the desired communication.

Embodiment 5

Figure 15:
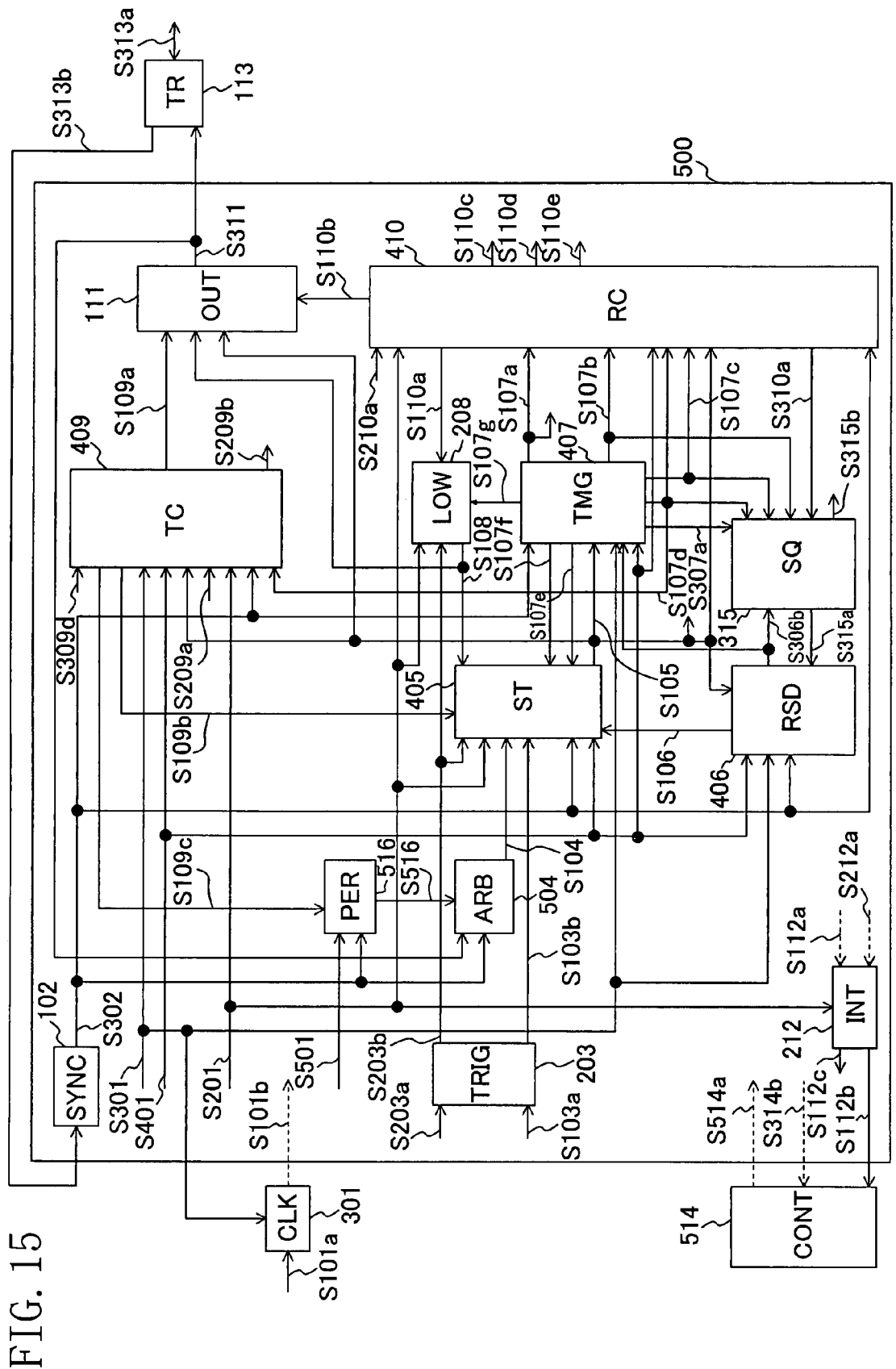
FIG. 15 is a block diagram illustrating a configuration of a CEC/AV.Link communication apparatus according to Embodiment 5 of the present invention.

FIG. 15 is a block diagram illustrating a configuration of a single-line bidirectional communication apparatus according to Embodiment 5 of the present invention. In FIG. 15, the same reference numerals as those of FIGS. 2, 10, 11 and 14 indicate the same or corresponding parts. As specific communication, CEC communication and AV.Link communication are assumed.

A controller 514 outputs control data S514a for controlling a CEC/AV.Link communication circuit 500.

As one of the control data 514a, an arbitration period setting signal S501 is output. The arbitration period setting signal S501 is a signal for setting a period of time from falling during which an arbitration monitoring process is not performed and a period of time from rising during which an arbitration monitoring process is not performed.

An arbitration period adjusting circuit (PER) 516 receives the arbitration period setting signal S501, the synchronization CEC/AV.Link input signal S302, and the arbitration period gate pulse signal S109c, and adjusts the arbitration period in accordance with the arbitration period gate pulse signal S109c so as to start counting up with an internal counter due to falling of the synchronization CEC/AV.Link input signal S302, and not to validate the arbitration period until a set value of the arbitration period setting signal S501 is reached, and start counting up with the internal counter due to rising, and not to validate the arbitration period until the set value of the arbitration period setting signal S501 is reached, and after the adjustment, generates and outputs an arbitration period gate pulse signal S516.

An arbitration monitoring circuit 504 receives the CEC/AV.Link output signal S311 and the synchronization CEC/AV.Link input signal S302, and adjusts the timings of the two signals into the same timing before comparing the two signals, and further causes the result of the comparison of the two signals to be reflected to every pulse of the drive clock S101b, where the input adjusted arbitration period gate pulse signal S516 is assumed to indicate a valid period. As the result of the comparison, when the two signals are not the same, a bus lost is recognized, and the bus lost detection signal S104 is output.

As described above, in CEC communication, a tolerable range of a waveform degradation of signal rising or falling is defined in the standard. In Embodiment 4, arbitration monitoring is performed using a fixed sampling point irrespective of the tolerable range, and therefore, a bus lost process cannot be performed with respect to a waveform degradation exceeding the tolerable range. Also, even if the CEC/AV.Link output signal S311 and the CEC/AV.Link input signal S313b which are input and output signals of the CEC/AV.Link communication circuit 400 are different from each other as the result of comparison at timing exceeding the tolerable range, it is considered that transmission from another party is performed. In this case, a bus lost cannot be recognized. In the worst case, arbitration monitoring cannot be performed, so that there is a possibility that a plurality of transmissions are established, i.e., an abnormal communication state. According to the CEC/AV.Link communication circuit 500 of Embodiment 5, only within the tolerable range, an arbitration monitoring process is not performed, and at timing exceeding the tolerable range, an arbitration monitoring process can be performed at every pulse of the drive clock S101b, thereby making it possible to avoid the above-described abnormal communication.

Embodiment 6

Figure 16:
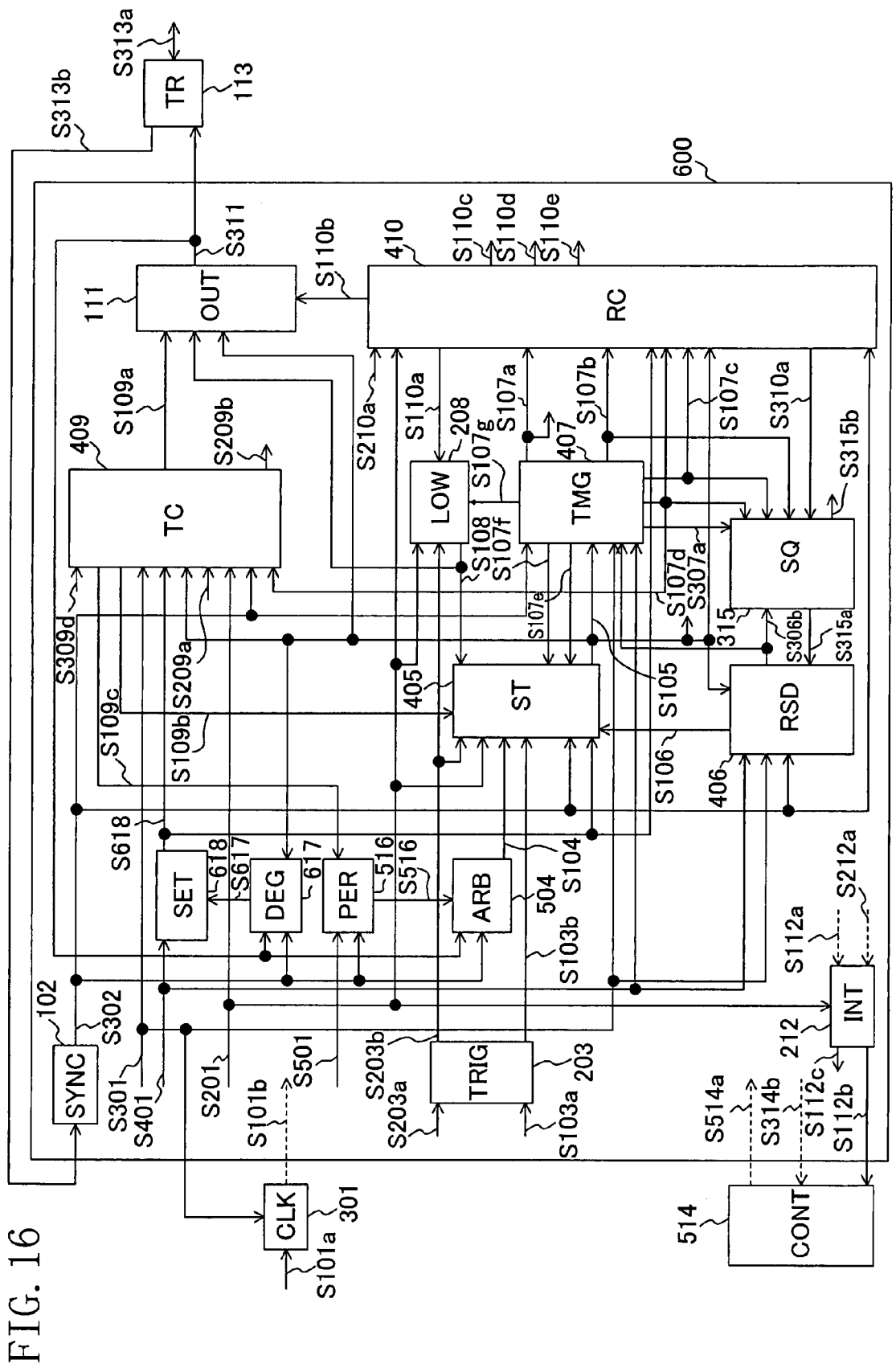
FIG. 16 is a block diagram illustrating a configuration of a CEC/AV.Link communication apparatus according to Embodiment 6 of the present invention.

FIG. 16 is a block diagram illustrating a configuration of a single-line bidirectional communication apparatus according to Embodiment 6 of the present invention. In FIG. 16, the same reference numerals as those of FIGS. 2, 10, 11, 14 and 15 indicate the same or corresponding parts. As specific communication, CEC communication and AV.Link communication are assumed.

A waveform degradation detecting circuit (DEG) 617 receives the CEC/AV.Link output signal S311 and the synchronization CEC/AV.Link input signal S302 in accordance with the state of the input state signal S105, adjusts the timings of the two signals into the same timing, and thereafter, detects a difference between falling and rising of the two signals, and outputs a waveform degradation value detecting signal S617.

A transmission timing set value adjusting circuit (SET) 618 receives the waveform degradation value detecting signal S617, and only a signal for setting transmission timing of the waveform timing setting signals S401, which is specifically a timing setting signal for setting rising (T3 in FIG. 1B) and falling (T6 in FIG. 1B) of start bit waveform timing during transmission; rising when "0" is output (T14 in FIG. 1C), rising when "1" is output (T10 in FIG. 1C), and falling when "0" and "1" are output (time T17 in FIG. 1C) of data bit waveform timing during transmission; and a time of forced LOW transmission. Therefore, in the input waveform degradation value detecting signal S617, a falling waveform degradation value is subtracted from an input waveform timing set value for forming falling, and in the input waveform degradation value detecting signal S617, a rising waveform degradation value is subtracted from an input waveform timing set value for forming rising, so that an adjusted transmission waveform timing setting signal S618 is generated and output.

The state determining circuit 405 receives the adjusted transmission waveform timing setting signal S618 instead of the waveform timing setting signal S401 input in Embodiment 4.

The transmission control circuit 409 receives the adjusted transmission waveform timing setting signal S618 instead of the waveform timing setting signal S401 input in Embodiment 4.

The reception control circuit 410 receives the adjusted transmission waveform timing setting signal S618 instead of the waveform timing setting signal S401 input in Embodiment 4.

As described above, according to the CEC/AV.Link communication circuit 600 of Embodiment 6, transmission can be performed in view of a signal degradation due to a connection situation with a communication party on the other end, so that a waveform received by a receiver can be a waveform which is a reference defined in the standard, resulting in communication optimal to each communication environment.

Embodiment 7

Figure 17:
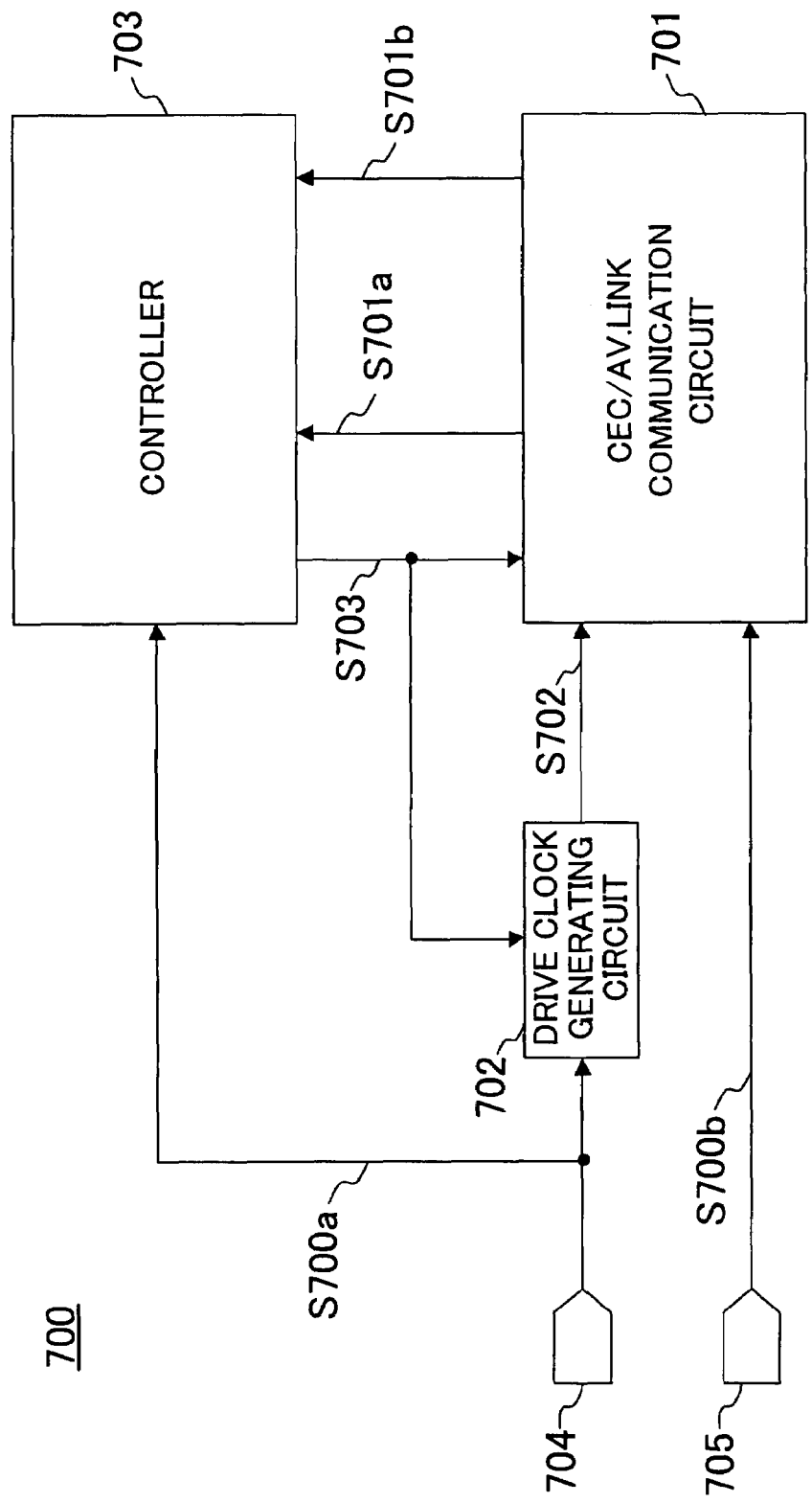
FIG. 17 is a block diagram illustrating a configuration of a CEC/AV.Link communication system according to Embodiment 7 of the present invention.

FIG. 17 is a block diagram illustrating a configuration of a system in which a single-line bidirectional communication apparatus according to any of Embodiments 3 to 6 of the present invention is used. As specific communication, CEC communication and AV.Link communication are assumed.

A CEC/AV.Link communication system 700 of FIG. 17 receives a reference clock S700a from a reference clock input terminal 704, which is input to a controller 703 and a drive clock generating circuit 702. The controller 703 also serves as an incorporated set of system controller.

Through a CEC/AV.Link communication input terminal 705, a CEC/AV.Link input signal S700b is input into the system via a CEC communication or AV.Link communication bus, and is input to a CEC/AV.Link communication circuit 701 described below. Here, the CEC/AV.Link communication input terminal 705 is actually a bidirectional terminal as illustrated in Embodiments 3 to 6, though is assumed to be an input terminal for the sake of convenience.

The drive clock generating circuit 702 receives a control data S703 from the controller 703 as the CEC/AV.Link communication selection signal S301 described in Embodiment 3, and outputs a drive clock S702, which is input to the CEC/AV.Link communication circuit 701.

The CEC/AV.Link communication circuit 701 receives the drive clock S702, the CEC/AV.Link input signal S700b, and the control data S703. The CEC/AV.Link communication circuit 701 outputs observation data S701a and an interrupt signal S701b, which are input to the controller 703.

The controller 703 generates a clock for driving the controller 703 inside the controller 703 based on the input reference clock S700a. Also, the controller 703 has a plurality of operating modes including a normal mode, a low-speed mode, and particularly a stop mode for achieving low power consumption. Also, the controller 703 has a function of returning from the stop mode to the normal mode or the low-speed mode in accordance with the interrupt signal S701b input from the CEC/AV.Link communication circuit 701.

Conventionally, when a communication function is implemented by a software process, the controller needs to be invariably operated in the normal mode so that the software process is performed even in a reception waiting state, and therefore, the controller consumes power. In contrast to this, according to the CEC/AV.Link communication system 700 of Embodiment 7, only the CEC/AV.Link communication circuit 701 is invariably operated, and the controller 703 can be in the stop mode in the reception waiting state, thereby making it possible to achieve low power consumption. Also, mode return can be performed using reception data.

Note that, when the circuit configuration supporting only CEC communication which have been described in Embodiments 1 and 2 are used instead of the CEC/AV.Link communication circuit 701, the control data S703 from the controller 703 to the drive clock generating circuit 702 is not required.

INDUSTRIAL APPLICABILITY

The single-line bidirectional communication apparatus and system of the present invention are particularly useful for achievement of CEC communication and AV.Link communication, and can be widely applied to communication having a communication format similar to those formats.

The invention claimed is:

1. A bidirectional communication apparatus which is used while being connected to a single bidirectional signal line and a controller for a software process, comprising:
    an input synchronizing circuit for synchronizing an input signal from the single bidirectional signal line based on a drive clock into a synchronized input signal;
    a trigger pulse generating circuit for generating a transmission request trigger pulse signal based on a transmission request from the controller;
    a state determining circuit for determining an operating state of the bidirectional communication apparatus to supply a state signal;
    a transmission control circuit for supplying a transmission data output edge generating pulse signal to control generation of a transmission waveform in accordance with a transmission data setting from the controller, based on the state signal which is changed to indicate a transmission state in accordance with the transmission request trigger pulse signal;
    a data output circuit for generating a waveform of an output signal to the single bidirectional signal line in accordance with the transmission data output edge generating pulse signal;
    an arbitration monitoring circuit for performing arbitration monitoring of a signal on the single bidirectional signal line during transmission;
    a reception start detecting circuit for supplying a start detection signal when the start of reception is recognized based on the synchronized input signal;
    a waveform timing check circuit for supplying a reception sampling pulse signal, and checking timing of a reception waveform of the synchronized input signal in response to the state signal which is changed to indicate a reception state in accordance with the start detection signal;
    a reception control circuit for controlling data sampling of the synchronized input signal in accordance with the reception sampling pulse signal, and decoding of a reception address;
    a forced LOW transmission control circuit for performing a control for forcedly transmitting a LOW level to the single bidirectional signal line when timing violation occurs in the synchronized input signal during reception; and
    an interrupt signal generating circuit for receiving an interrupt generating edge signal from each circuit and generating an interrupt signal to the controller,
    wherein the controller is configured to receive, as observation data, reception data and a result of decoding the reception address from the reception control circuit.

2. The bidirectional communication apparatus of claim 1, further comprising:
    an open drain terminal for controlling conversion between a bidirectional signal on the single bidirectional signal line, and the input signal and the output signal, respectively.

3. The bidirectional communication apparatus of claim 1, wherein
    the state determining circuit determines whether the operating state of the bidirectional communication apparatus is an idle state, a transmission start waiting state, a transmission state, a reception state, or a forced LOW transmission state.

4. The bidirectional communication apparatus of claim 1, wherein
    the trigger pulse generating circuit generates a forced LOW transmission start and end request trigger signal based on a forced LOW transmission start and end request from the controller,
    the state determining circuit determines the operating state of the bidirectional communication apparatus based on the forced LOW transmission start and end request trigger signal, and setting of continuation and ending of transmission of the transmission control circuit and setting of ACK output during reception of the reception control circuit are controlled using the controller.

5. The bidirectional communication apparatus of claim 1, further comprising:
a drive clock generating circuit for generating the drive clock from a reference clock so that the drive clock has different frequencies for two bidirectional communication protocols; and
an additional sequence detecting circuit for performing a reception process with an additional sequence with respect to one of the two bidirectional communication protocols in which the additional sequence is present in a communication format,
wherein the reception start detecting circuit selects a process of one of the two bidirectional communication protocols in a recognition process during the start of reception, and
the waveform timing check circuit checks timing in a reception waveform corresponding to the two bidirectional communication protocols.

6. The bidirectional communication apparatus of claim 1, wherein
the controller is used to set a forced LOW transmission end time for the state determining circuit, transmission waveform timing for the transmission control circuit, a reception start determination timing condition for the reception start detecting circuit, a reception waveform timing check condition for the waveform timing check circuit, and ACK transmission timing for the reception control circuit.

7. The bidirectional communication apparatus of claim 1, further comprising:
an arbitration period adjusting circuit for generating an adjusted arbitration period gate pulse signal which is adjusted so that arbitration is stopped during a period of time set by the controller from rising and falling of a bidirectional signal on the single bidirectional signal line based on a signal indicating an arbitration period,
wherein the arbitration monitoring circuit performs arbitration monitoring at every pulse of the drive clock based on the adjusted arbitration period gate pulse signal.

8. The bidirectional communication apparatus of claim 1, further comprising:
a waveform degradation detecting circuit for generating a waveform degradation value detection signal indicating a waveform degradation of an output signal from the data output circuit to the single bidirectional signal line; and
a transmission timing set value adjusting circuit for performing a computation process based on the waveform degradation value detection signal and a waveform timing setting signal from the controller to generate an adjusted transmission waveform timing setting signal.

9. A bidirectional communication system comprising the bidirectional communication apparatus of claim 1 and the controller, wherein
the controller has a stop mode which achieves low power consumption, and has a function of going from the stop mode to an operating mode in accordance with an interrupt signal from the bidirectional communication apparatus.

* * * * *